(12) United States Patent
Okamura

(10) Patent No.: US 7,590,946 B2
(45) Date of Patent: Sep. 15, 2009

(54) DISPLAY APPARATUS AND DISPLAY METHODS FOR SCROLLING ITEM LISTS

(75) Inventor: Shuichi Okamura, Ichihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 372 days.

(21) Appl. No.: 11/290,686

(22) Filed: Nov. 30, 2005

(65) Prior Publication Data
US 2006/0123357 A1 Jun. 8, 2006

(30) Foreign Application Priority Data
Dec. 8, 2004 (JP) ............................. 2004-355883

(51) Int. Cl.
*G06F 3/048* (2006.01)
(52) U.S. Cl. .................. 715/786; 715/784; 715/798; 715/830
(58) Field of Classification Search ......... 715/784–787, 715/798, 828–830, 833
See application file for complete search history.

(56) References Cited

U.S. PATENT DOCUMENTS

| | | | | |
|---|---|---|---|---|
| 5,572,647 A | * | 11/1996 | Blades | 715/798 |
| 5,896,132 A | * | 4/1999 | Berstis et al. | 715/786 |
| 5,923,861 A | * | 7/1999 | Bertram et al. | 715/786 |
| 6,154,205 A | * | 11/2000 | Carroll et al. | 345/684 |
| 6,252,594 B1 | * | 6/2001 | Xia et al. | 715/786 |
| 6,300,967 B1 | * | 10/2001 | Wagner et al. | 715/784 |
| 6,734,883 B1 | * | 5/2004 | Wynn et al. | 715/830 |

FOREIGN PATENT DOCUMENTS

JP 2001-290574 A 10/2001

OTHER PUBLICATIONS

Internet Archive.org: "http://www.fast-consulting.com/GUI+Design+Handbook/gdhb_scrollbar.htm", Jul. 14, 2003, 7 pages.*

* cited by examiner

*Primary Examiner*—William L Bashore
*Assistant Examiner*—Andrew L Tank
(74) *Attorney, Agent, or Firm*—Canon U.S.A., Inc. I.P. Division

(57) ABSTRACT

A display apparatus includes a display unit configured to display an item list component including at least one scroll indicator for scroll indication on a screen; and a display-position setting unit configured to set the display position of the scroll indicator such that the scroll indicator is displayed in a direction opposite to the direction in which the item list component extends beyond the screen or orthogonal to the direction in which the item list component extends beyond the screen, if the item list component extends beyond the screen.

6 Claims, 20 Drawing Sheets

PRIOR ART
FIG. 4

| CLASS10123456789123456778 | CENTER 01234567... | AUTOMATIC COLOR SELECTION1 012 |
|---|---|---|
| CLASS20123456789123456778 | CENTER 01234567... | AUTOMATIC COLOR SELECTION2 012 |
| CLASS30123456789123456778 | CENTER 01234567... | AUTOMATIC COLOR SELECTION3 012 |
| CLASS40123456789123456778 | CENTER 01234567... | AUTOMATIC COLOR SELECTION4 012 |
| CLASS50123456789123456778 | CENTER 01234567... | AUTOMATIC COLOR SELECTION5 012 |
| CLASS60123456789123456778 | CENTER 01234567... | AUTOMATIC COLOR SELECTION6 012 |
| CLASS70123456789123456778 | CENTER 01234567... | AUTOMATIC COLOR SELECTION7 012 |
| CLASS80123456789123456778 | CENTER 01234567... | AUTOMATIC COLOR SELECTION8 012 |

| CLASS10123456789123456778 | CENTER 0123456789 | AUTOMATIC COLOR SELECTION1 012 |
|---|---|---|
| CLASS20123456789123456778 | CENTER 0123456789 | AUTOMATIC COLOR SELECTION2 012 |
| CLASS30123456789123456778 | CENTER 0123456789 | AUTOMATIC COLOR SELECTION3 012 |
| CLASS40123456789123456778 | CENTER 0123456789 | AUTOMATIC COLOR SELECTION4 012 |
| CLASS50123456789123456778 | CENTER 0123456789 | AUTOMATIC COLOR SELECTION5 012 |
| CLASS60123456789123456778 | CENTER 0123456789 | AUTOMATIC COLOR SELECTION6 012 |
| CLASS70123456789123456778 | CENTER 0123456789 | AUTOMATIC COLOR SELECTION7 012 |
| CLASS80123456789123456778 | CENTER 0123456789 | AUTOMATIC COLOR SELECTION8 012 |

| CLASS1012345678912345678 | NTER 012345678901 | AUTOMATIC COLOR SELECTION1 012 |
|---|---|---|
| CLASS2012345678912345678 | NTER 012345678902 | AUTOMATIC COLOR SELECTION2 012 |
| CLASS3012345678912345678 | NTER 012345678903 | AUTOMATIC COLOR SELECTION3 012 |
| CLASS4012345678912345678 | NTER 012345678904 | AUTOMATIC COLOR SELECTION4 012 |
| CLASS5012345678912345678 | NTER 012345678905 | AUTOMATIC COLOR SELECTION5 012 |
| CLASS6012345678912345678 | NTER 012345678906 | AUTOMATIC COLOR SELECTION6 012 |
| CLASS7012345678912345678 | NTER 012345678907 | AUTOMATIC COLOR SELECTION7 012 |
| CLASS8012345678912345678 | NTER 012345678908 | AUTOMATIC COLOR SELECTION8 012 |

| CLASS1012345678912345678 | R 012345678901 | AUTOMATIC COLOR SELECTION1 012 |
|---|---|---|
| CLASS2012345678912345678 | R 012345678902 | AUTOMATIC COLOR SELECTION2 012 |
| CLASS3012345678912345678 | R 012345678903 | AUTOMATIC COLOR SELECTION3 012 |
| CLASS4012345678912345678 | R 012345678904 | AUTOMATIC COLOR SELECTION4 012 |
| CLASS5012345678912345678 | R 012345678905 | AUTOMATIC COLOR SELECTION5 012 |
| CLASS6012345678912345678 | R 012345678906 | AUTOMATIC COLOR SELECTION6 012 |
| CLASS7012345678912345678 | R 012345678907 | AUTOMATIC COLOR SELECTION7 012 |
| CLASS8012345678912345678 | R 012345678908 | AUTOMATIC COLOR SELECTION8 012 |

501  502     505  506     503  504

DISPLAY APPARATUS AND DISPLAY METHODS FOR SCROLLING ITEM LISTS

BACKGROUND OF THE INVENTION

1. Field of the Invention

The present invention relates to a display apparatus and a display method, which display an item list component including at least one scroll indicator.

2. Description of the Related Art

Components in graphical user interfaces (GUIs) include pop-up menus which are used for selecting an item and in which selection items are listed. FIG. 2 shows a display example of such a pop-up menu. Referring to FIG. 2, the pop-up menu includes three items that are displayed at a coordinate (X, Y) in a screen having a width SW and a height SH. The pop-up menu has a height H. A left scroll button 200 and a right scroll button 201 are disabled (displayed in gray) because left and right scrolling is not required. If a desired item is selected or a position other than the position where the item is located is selected to shift focus, the pop-up menu closes.

The components used for selecting an item include components in which an item is selected from a pull-down menu. Such a component is referred to as "Choice" (also called as a selection box or a combo box). In the Choice, a selected item is displayed like a button (referred to as a "title button"). Pointing the title button displays a pop-up menu above or below the title button. FIG. 3 shows an example of the pop-up menu.

Referring to FIG. 3, component 300 is a Choice. In the example in FIG. 3, a state in which a title button ("abcd") 301 with a down arrow is pointed to display a pull-down menu (pop-up menu) 302 is shown. Component 303 displayed on the right hand of the pull-down menu 302 is also considered a Choice. The pop-up menu of the component 303 closes and only a title button ("abcdefg1") is displayed.

If a desired item in the pull-down menu 302 is selected, the selected item becomes a title button and the pull-down menu 302 closes. If a position outside of the pull-down menu 302 or the title button is pointed in this state, the pull-down menu 302 closes.

In contrast, an item list component (referred to as "List") in which an item can be selected among multiple items that are always listed does not close, unlike the Choice and the pop-up menu. Accordingly, multiple items may be simultaneously selected. FIGS. 4 to 7 show display examples of the item list component.

When the pop-up menu or the Choice includes both vertical (up and down) scroll buttons and horizontal (right and left) scroll buttons, the arrangement of the horizontal and vertical scroll buttons is set in advance. For example, the horizontal scroll buttons are arranged on the lower part of the pop-up menu or the Choice (refer to FIGS. 2 and 4 to 7) and the vertical scroll buttons are arranged in the rightmost part of the pop-up menu or the Choice (refer to FIGS. 4 to 7). In other words, the arrangement of the horizontal and vertical scroll buttons is determined independently of the position of the pop-up menu or the Choice.

When a touch panel is used as an input device, not a scroll bar subjected to drag operation, but the scroll buttons indicating the scroll direction is suitable because a user presses each button in the touch panel with his/her finger to point the button. Since the scroll buttons are required to have a size corresponding to the tip of a finger at a minimum, the scroll buttons disadvantageously occupy a larger space.

If a menu window extends beyond the right edge of the screen, the scroll bar in the rightmost part of the menu window is hidden and is disabled. In order to resolve this problem, a manner of shifting the scroll bar to a visible area in the rightmost part of the screen is disclosed in Japanese Patent Laid-Open No. 2001-290574 (if the menu window extends beyond the bottom edge of the screen, the scroll bar is shifted to the bottom of the screen).

In the pop-up menu or the Choice, if the character string representing the content of an item is too long to extend beyond the display frame, part of the character string of the item is abbreviated to " . . . ". For example, when there is an item "abcdefghij" and the last "efghij" is hidden, the item "abcdefghij" is displayed as "abcd . . . ". Alternatively, the item may be displayed as "ab . . . ij", in which the central part of the item is abbreviated.

As described above, since the hidden scroll bar is only shifted inside the screen in related arts, there are problems in that information hidden behind the shifted scroll bar cannot be selected and the visibility is reduced. If the horizontal scroll buttons are fixed in the lower part of the pop-up menu or the Choice despite the fact that the pop-up menu or the Choice is arranged in the lower part of the screen, the horizontal scroll buttons hide several selection items. In addition, in this arrangement, only a smaller number of items are displayed, thus reducing the visibility.

If the vertical scroll buttons are fixed in the rightmost part of the pop-up menu or the Choice despite the fact that the pop-up menu or the Choice is arranged in the rightmost part of the screen, the number of visible characters in each item is decreased due to the area occupied by the vertical scroll buttons. Hence, if the items have the same displayed character string, except for the hidden characters, there are problems in that the difference between the items becomes indistinguishable and that the user cannot determine which item is to be selected. In addition, since the display area of the scroll buttons cannot be shifted depending on the content of the item, the area occupied by the scroll buttons may hinder the items from being distinguished. Even if the items can be distinguished, the number of displayed items or the number of characters in each item is limited and, therefore, the visibility is reduced.

If the content of items is abbreviated to certain characters, such as " . . . ", and the items have the same content after the abbreviation in the List because the content of the items extends beyond the display area, the difference between the items can be indistinguishable which can be problematic and confusing to the user.

SUMMARY OF THE INVENTION

The present invention provides a display apparatus and a display method that display a scroll indicator in a direction in which the display area of the scroll indicator does not extend beyond a screen if an item list component displayed along with the scroll indicator for scroll indication extends beyond the screen.

According to another aspect of the present invention, a scroll indicator may be displayed while keeping the display of items even if the item list component displayed along with the scroll indicator for scroll indication extends beyond the screen.

According to yet another aspect of the present invention, the item list component may be scrolled so as to distinguish the difference between the display items if the display items in the item list component are abbreviated and some display items have the same displayed content.

According to another embodiment of the present invention, a display apparatus is provided which includes a display unit configured to display an item list component including at least one scroll indicator for scroll indication on a screen; and a display-position setting unit configured to set the display position of the scroll indicator such that the scroll indicator is displayed in a direction opposite to the direction in which the item list component extends beyond the screen or orthogonal to the direction in which the item list component extends beyond the screen, if the item list component extends beyond the screen.

A pop-up menu is exemplified in several embodiments of the present invention. However, the present invention is also applicable to a component that is a "Choice" having a title button that is pointed to display the pull-down menu. In other words, the present invention is applicable to the Choice replaced with the pop-up menu.

In other aspects of the present invention, although the scroll buttons are displayed in the bottom part of the pop-up menu in the first to third embodiments of the present invention, the scroll buttons may be displayed in the top part of the pop-up menu. For example, the scroll buttons displayed in the bottom part of a pop-up menu may be shifted to the top part of the pop-up menu. Similarly, the scroll buttons displayed in the rightmost part of the pop-up menu may be shifted to the leftmost part of the pop-up menu.

When the scroll buttons displayed in the bottom or rightmost part of the pop-up menu are shifted to the top or leftmost part of the pop-up menu, respectively, a determination of whether the pop-up menu extends beyond the top or left edge of the display screen may be made.

A "List" is exemplified in another embodiment of the present invention. And, it is also noted that the present invention is applicable to a case in which the horizontal scroll buttons are automatically provided in the pop-up menu or the Choice such that the items becomes distinguishable if part of the content of the items is abbreviated and the items have the same displayed content.

Further aspects and features of the present invention will become apparent from the following description of exemplary embodiments with reference to the attached drawings.

BRIEF DESCRIPTION OF THE DRAWINGS

FIG. 4 shows an example of an item list component.

FIG. 5 shows another example of the item list component.

FIG. 6 shows another example of the item list component.

FIG. 7 shows another example of the item list component.

DESCRIPTION OF THE EMBODIMENTS

Various embodiments, features and aspects of the present invention will be described with reference to the attached drawings.

First Exemplary Embodiment

Figure 1:
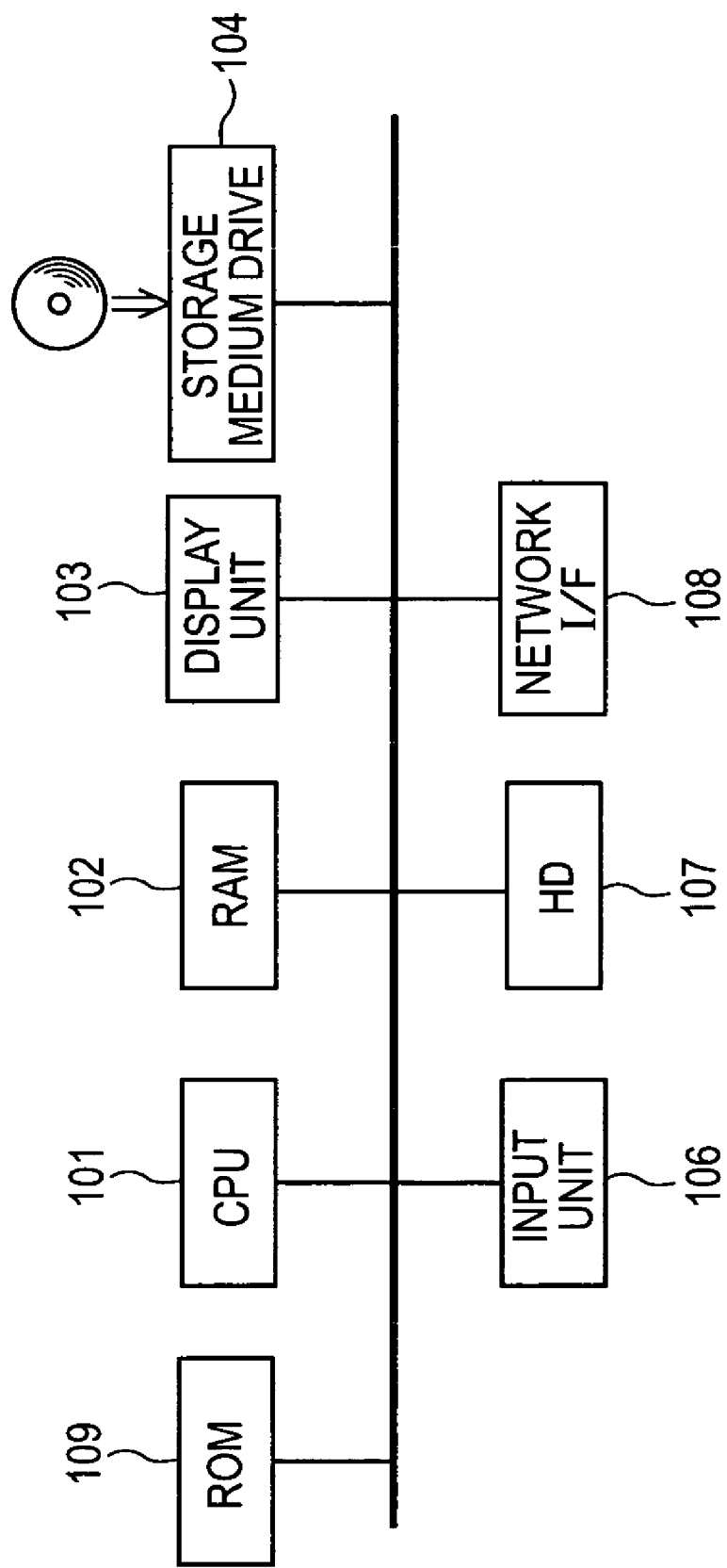
FIG. 1 is a block diagram schematically showing an exemplary structure of an information processing apparatus according to embodiments of the present invention.

FIG. 1 is a block diagram schematically showing the structure of an information processing apparatus according to a first embodiment of the present invention. The present invention applies not only to a computer device, such as a personal computer (PC), but also to an image forming apparatus, such as a digital multifunction machine or a copying machine, a communication terminal device, such as a mobile device, or any other device with similar features of the aforementioned devices.

Referring to FIG. 1, a CPU 101 controls a variety of processing described below and the operation of the information processing apparatus in accordance with programs loaded in a random access memory (RAM) 102. When execution of programs installed in an external storage device (hard disk (HD)) 107 is instructed, the programs are loaded in the RAM 102 and are executed under the control of the CPU 101. The RAM 102 also serves as a working area for temporarily storing a variety of data in the execution of the variety of control processing by the CPU 101. When the programs executed by the CPU 101 are fixed in this information processing apparatus, a control program stored in a read only memory (ROM) 109 may be executed under the control of the CPU 101. A display unit 103 includes a liquid crystal, plasma display panel, or the like and displays, for example, messages for a user, menus, and data to be processed. The display unit 103 may include a touch panel. In this case, the display unit 103 also has a function of an input unit 106 (but is notationally illustrated separately since it has two distinct functions).

Still referring to FIG. 1, a storage medium drive 104 is, for example, a compact disc drive or a flexible disc drive. A storage medium, such as a compact disc-read only memory (CD-ROM) or a flexible disk, is loaded in the storage medium drive 104 that controls writing and reading data in and from the storage medium. The input unit 106 is, for example, a keyboard or a pointing device (hereinafter referred to as a "mouse") and is operated by the user to select an item, input data, or instruct an operation by the use of a menu screen described below. The external storage device (HD) 107 includes a high-capacity memory, such as a hard disk or a magneto-optical disc (MO), and stores an operating system (OS), application programs, and so on. When execution of an application program is instructed with the input unit 106, the application program is read out from the external storage device (HD) 107 and the readout application program is loaded in the RAM 102 and is executed by the CPU 101. A network interface (I/F) 108 connects the information processing apparatus to a network, such as a local area network (LAN) or the Internet, to transmit and receive data.

Figure 8:
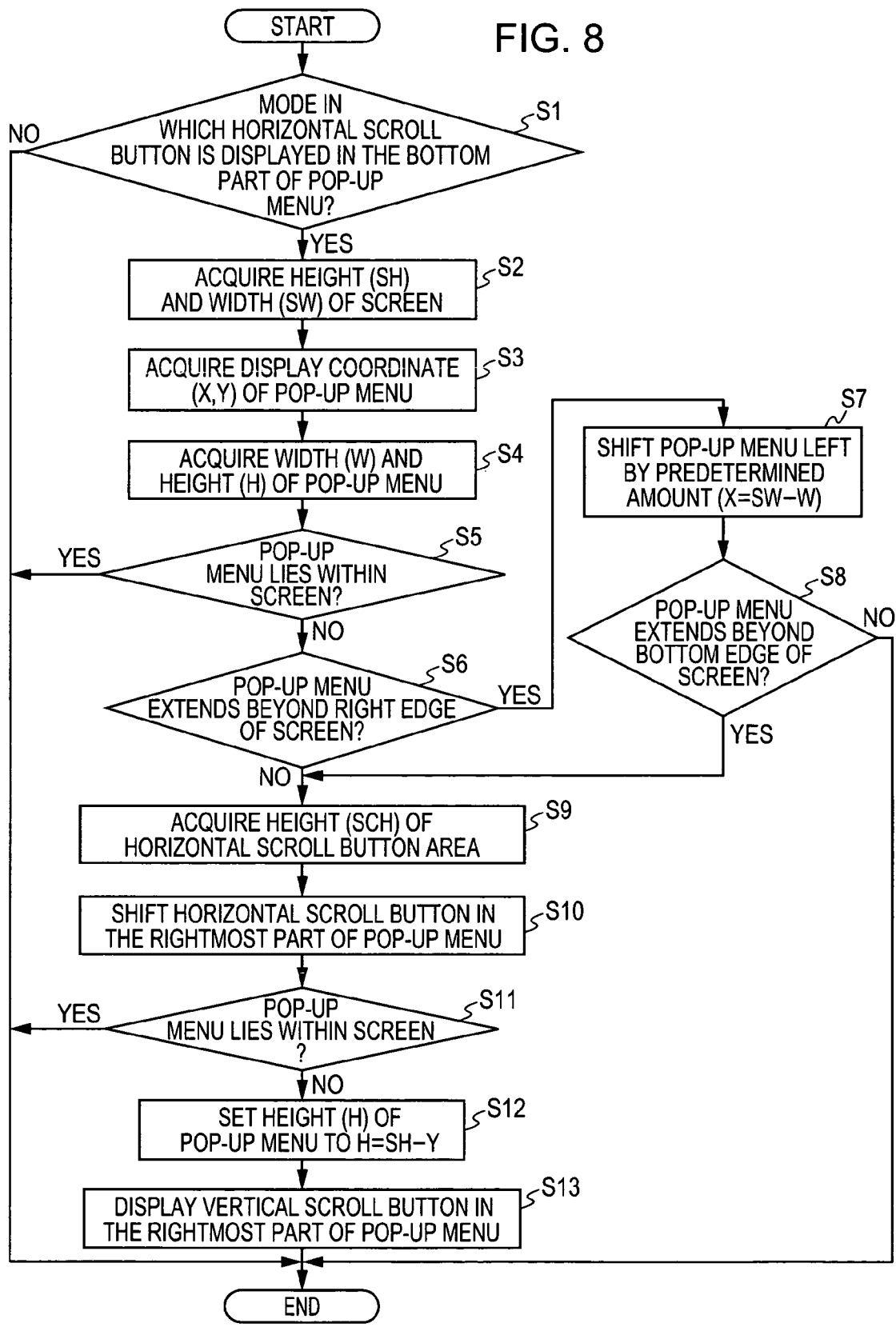
FIG. 8 is a flowchart showing an exemplary process of displaying the pop-up menu in the information processing apparatus according to a first embodiment of the present invention.

FIG. 8 is a flowchart showing an exemplary operation of the information processing apparatus according to the first embodiment. For illustrative purposes, the pop-up menu includes three items "abcd", "efgh", and "ijklm" (refer to FIG. 2). When a mode in which horizontal scroll buttons are displayed is set, the horizontal scroll buttons, including a left scroll button 200 and a right scroll button 201, are displayed in the bottom part of the pop-up menu even when the horizontal scroll buttons are not required. The displayed horizontal scroll buttons are prepared for addition of items having long names because the items can be dynamically added to the pop-up menu. When the horizontal scroll buttons are not required, both the left scroll button 200 and the right scroll button 201 are disabled. I.E., the buttons 200 and 201 are in a state in which the buttons cannot be pointed (are displayed in light gray in the screen).

According to the first embodiment, it is possible to display the pop-up menu in a desired position in the screen (for example, a position where the user clicks the display unit 103 or a position where a touch panel is touched when the display unit 103 includes the touch panel), and the Y coordinate (vertical coordinate) at which the pop-up menu is displayed in the screen is shifted in accordance with displayed scenes.

The flowchart in FIG. 8 shows an exemplary process of displaying the pop-up menu in the information processing apparatus according to the first embodiment. The program for performing this process is loaded in the RAM 102 in the execution of the program or is stored in the ROM 109.

The process of displaying the pop-up menu is started in response to an instruction to display the pop-up menu. In Step S1, the process determines whether a mode in which the horizontal scroll buttons (the left scroll button 200 and the right scroll button 201 in FIG. 2) are displayed in the bottom part of the pop-up menu is set. If the process determines that a mode in which the horizontal scroll buttons are not displayed is set, the process terminates.

Figure 2:
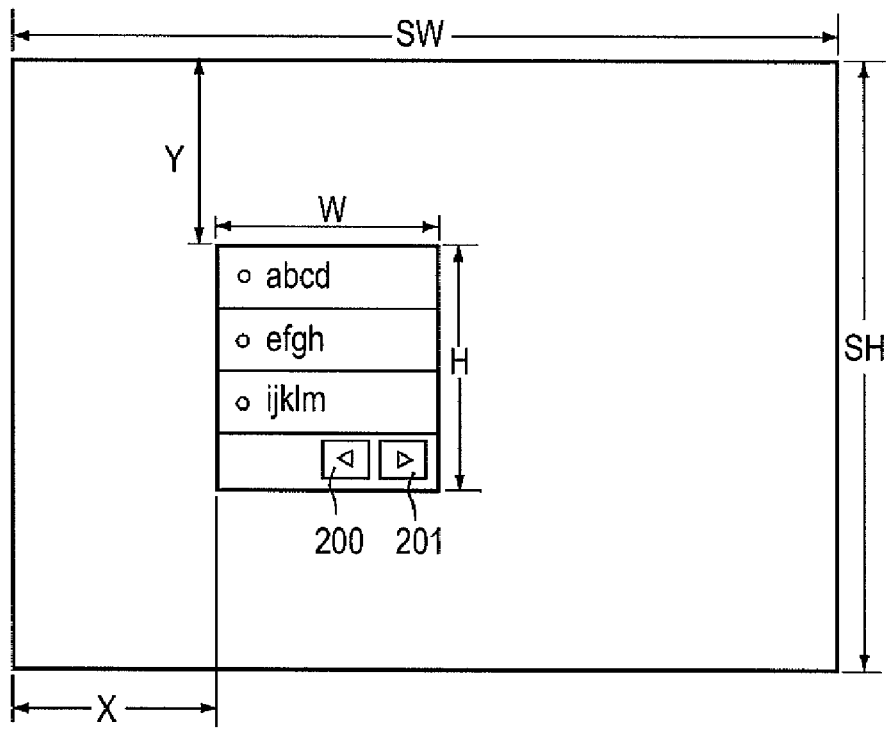
FIG. 2 shows a display example of a pop-up menu.
Figure 3:
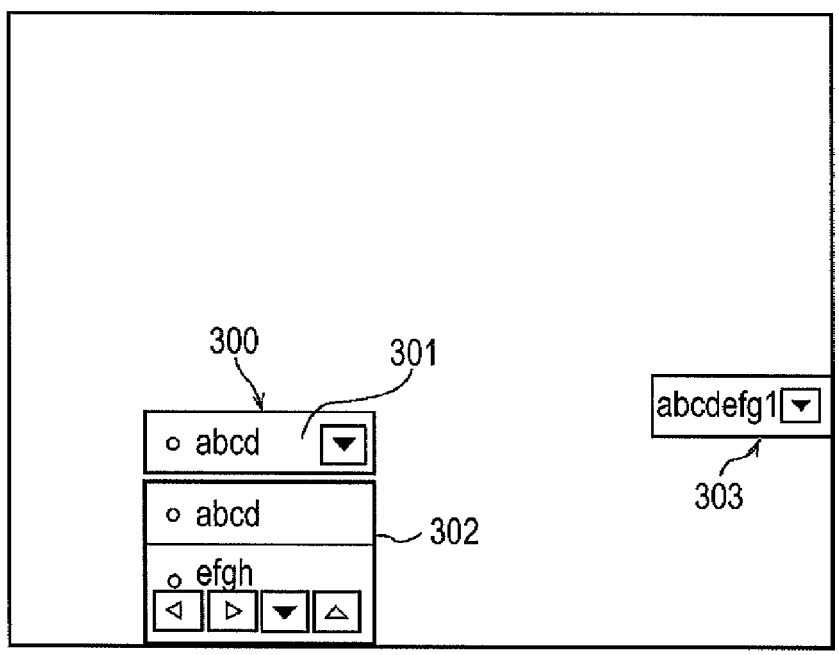
FIG. 3 shows another display example of the pop-up menu.

If the process determines that the mode in which the horizontal scroll buttons are displayed in the bottom part of the pop-up menu is set, then in Step S2, the process acquires a height SH and a width SW of the display screen of the display unit 103. In Step S3, the process acquires a coordinate (X, Y) of the position on the screen where the pop-up menu is displayed (a coordinate (X, Y) of the upper left corner of the pop-up menu (refer to FIG. 2)). In Step S4, the process acquires a width W and a height H of the pop-up menu. In Step S5, the process determines whether the pop-up menu lies within the display screen. This determination is based on whether the sum of the Y coordinate of the pop-up menu and the height H thereof is larger than the height SH of the display screen of the display unit 103 and on whether the sum of the X coordinate of the pop-up menu and the width W thereof is larger than the width SW of the display screen of the display unit 103. If SH<Y+H or SW<X+W, it is determined that the pop-up menu extends beyond the bottom edge or right edge of the display screen. If the process determines that the pop-up menu lies within the display screen in Step S5, the process terminates. FIG. 2 shows an example of this state.

Figure 16:
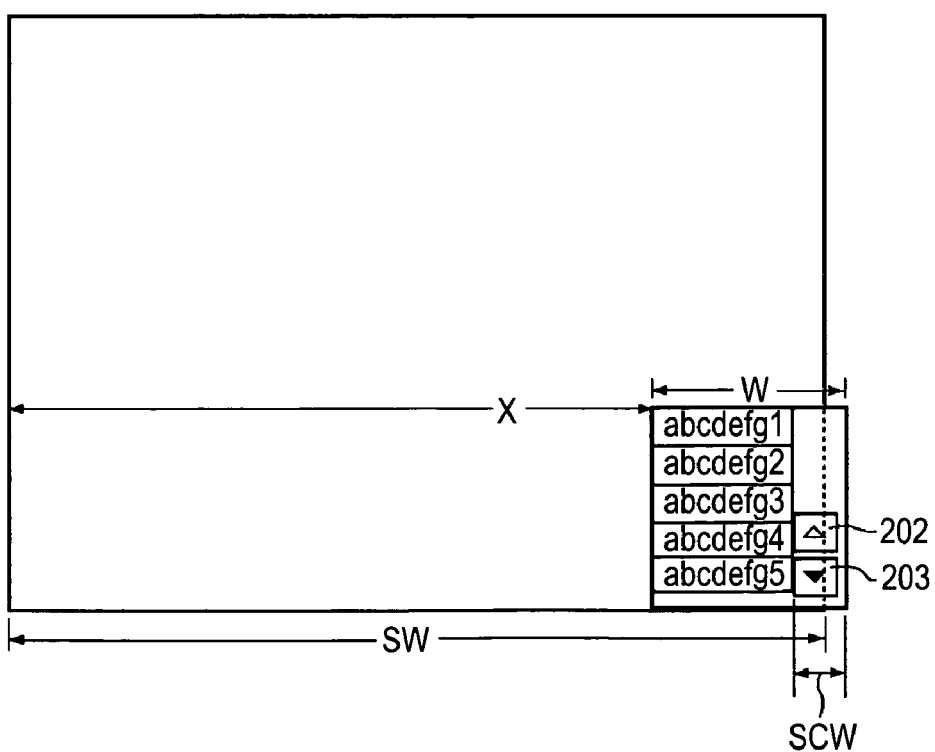
FIG. 16 shows a state in which the pop-up menu extends beyond the right edge of the display screen.

If the process determines in Step S5 that the pop-up menu does not lie within the display screen (for example, refer to FIG. 9), then in Step S6, the process determines whether the pop-up menu extends beyond the right edge of the display screen (for example, refer to FIG. 16). If the process determines that the pop-up menu extends beyond the right edge of the display screen, then in Step S7, the process shifts the pop-up menu left by a predetermined amount. The predetermined amount here may be an amount by which the pop-up menu is shifted to lie within the display screen or an amount by which the pop-up menu is shifted such that the names of the items in the pop-up menu become distinguishable (a process performed if the pop-up menu extends beyond the right edge of the display screen will be described in detail below). In Step S8, the process determines whether the pop-up menu extends beyond the display screen (i.e., whether the pop-up menu extends beyond the bottom edge of the display screen) after the pop-up menu that extended the right edge of the display screen has been shifted. If the process determines that the pop-up menu lies within the display screen, the process terminates.

Figure 9:
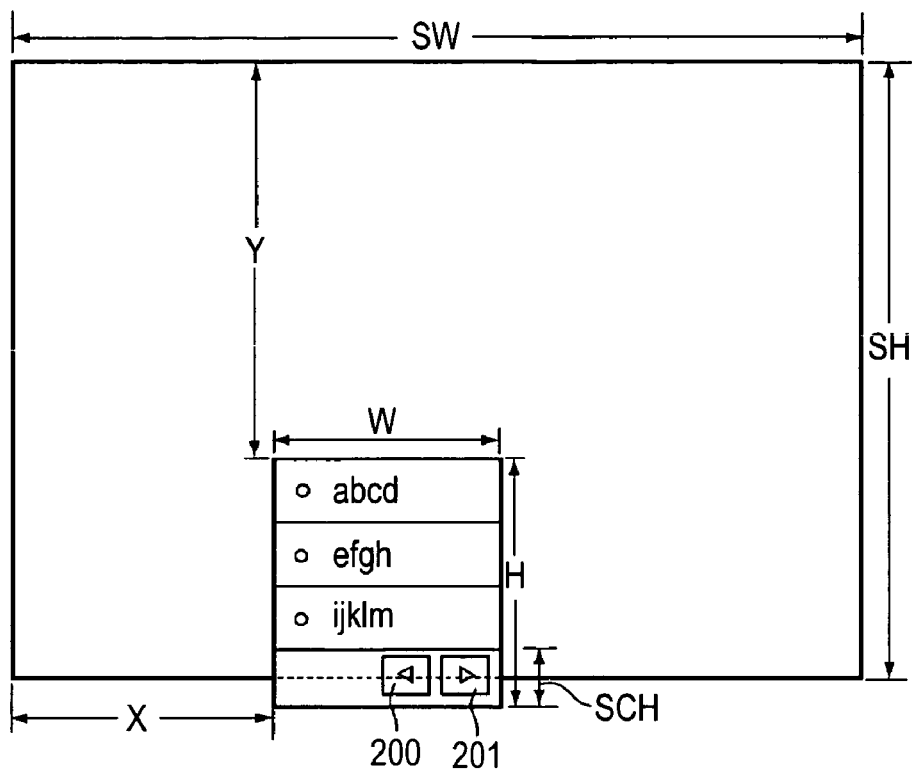
FIG. 9 shows a state in which the pop-up menu extends beyond the bottom edge of a display screen.

If the process determines that the pop-up menu does not extend beyond the right edge of the display screen in Step S6 or if the pop-up menu extends beyond the bottom edge of the display screen in Step S8, then in Step S9, the process acquires a height SCH of an area where the left scroll button 200 and the right scroll button 201 are displayed (refer to FIG. 9). FIG. 9 shows a state in which the pop-up menu displayed at the coordinate (X, Y) on the display screen extends beyond the bottom edge of the display screen.

Figure 10:
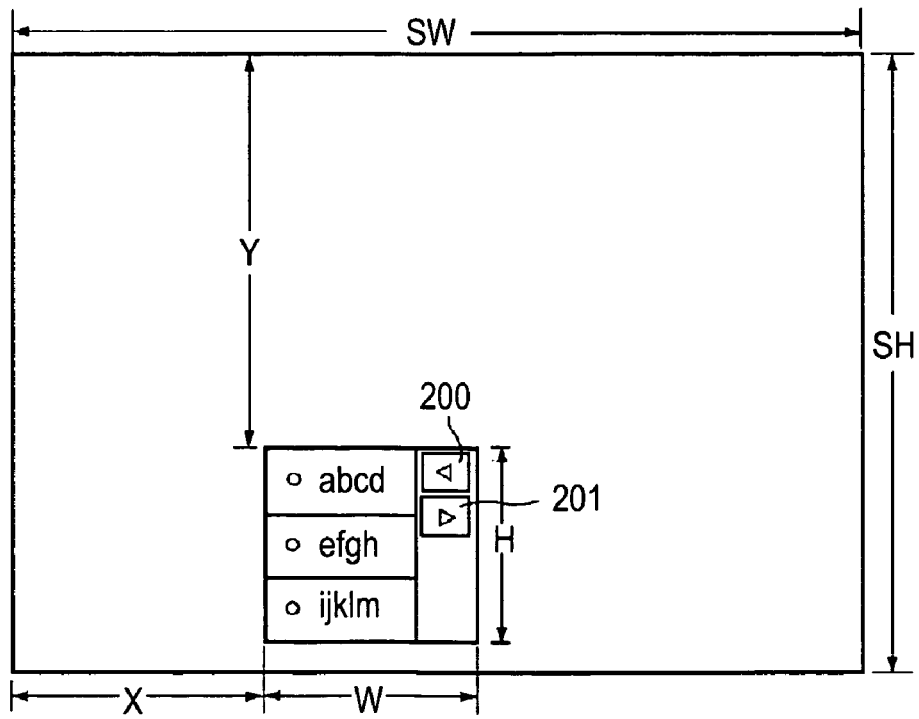
FIG. 10 shows a state in which horizontal scroll buttons are shifted to the rightmost part of the pop-up menu according to the first embodiment of the present invention.

In Step S10, the process clears the area where the left scroll button 200 and the right scroll button 201 are displayed in the bottom part of the pop-up menu. This clearance decreases the height H of the pop-up menu by the height SCH and the height H is equal to a height given by subtracting the height SCH from the height H. The process shifts the left scroll button 200 and the right scroll button 201 displayed in the bottom part of the pop-up menu to an area in the rightmost part of the pop-up menu, as shown in FIG. 10. FIG. 10 shows a state in which the left scroll button 200 and the right scroll button 201 are shifted from the state shown in FIG. 9 to the rightmost part of the pop-up menu in Steps S9 and S10 in FIG. 8.

As described above, if it is determined that the pop-up menu, which is an item list component, does not lie within the display screen, the horizontal scroll buttons 200 and 201 (scroll indicators for scroll indication) are shifted toward a direction (rightward) orthogonal to the direction (downward) in which the pop-up menu, which is an item list component, extends beyond the display screen.

In Step S11, the process determines whether the vertical scroll buttons are required. More specifically, the process determines whether the sum of the Y coordinate of the pop-up menu and the height H thereof is larger than the height SH of the display screen (i.e., whether SH<Y+H). If the process determines that the height SH of the display screen is larger than the sum (SH≧Y+H), the process terminates because the entire pop-up menu lies within the display screen and does not extend beyond the display screen. Otherwise, in Step S12, the process sets the height H of the pop-up menu to be equal to SH−Y (H=SH−Y). In Step S13, the process displays vertical scroll buttons 202 and 203 in the rightmost part of the pop-up menu, as shown in FIG. 12, because all the items cannot be displayed due to the height H of the pop-up menu that is decreased.

Figure 11:
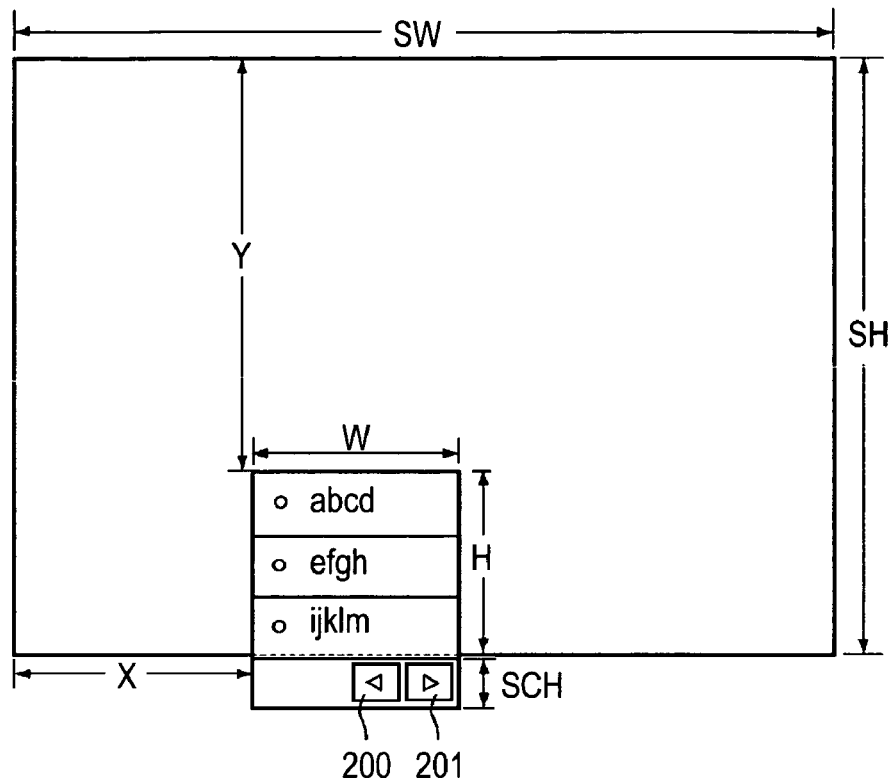
FIG. 11 shows an example in which the pop-up menu has a larger Y coordinate than that of the pop-up menu shown in FIG. 9 and the pop-up menu extends beyond the bottom edge of the display screen by an amount larger than that in the pop-up menu in FIG. 9.

FIG. 11 shows an example in which the pop-up menu has a larger Y coordinate than that of the pop-up menu shown in FIG. 9 and the pop-up menu extends beyond the bottom edge of the display screen by an amount larger than that in the pop-up menu in FIG. 9. In the example in FIG. 11, it is determined in Step S11 in FIG. 8 that the pop-up menu does not lie within the display screen. Hence, the vertical scroll buttons are required and the height H of the pop-up menu is adjusted in Step S12 such that the pop-up menu does not extend beyond the display screen. More specifically, the height H of the pop-up menu is adjusted such that the bottom of the pop-up menu coincides with the bottom of the display screen (H=SH−Y). The vertical scroll buttons 202 and 203 are displayed in the rightmost part of the pop-up menu, along with the horizontal scroll buttons 200 and 201, in Step S13 (which is the state is shown in FIG. 12).

Figure 12:
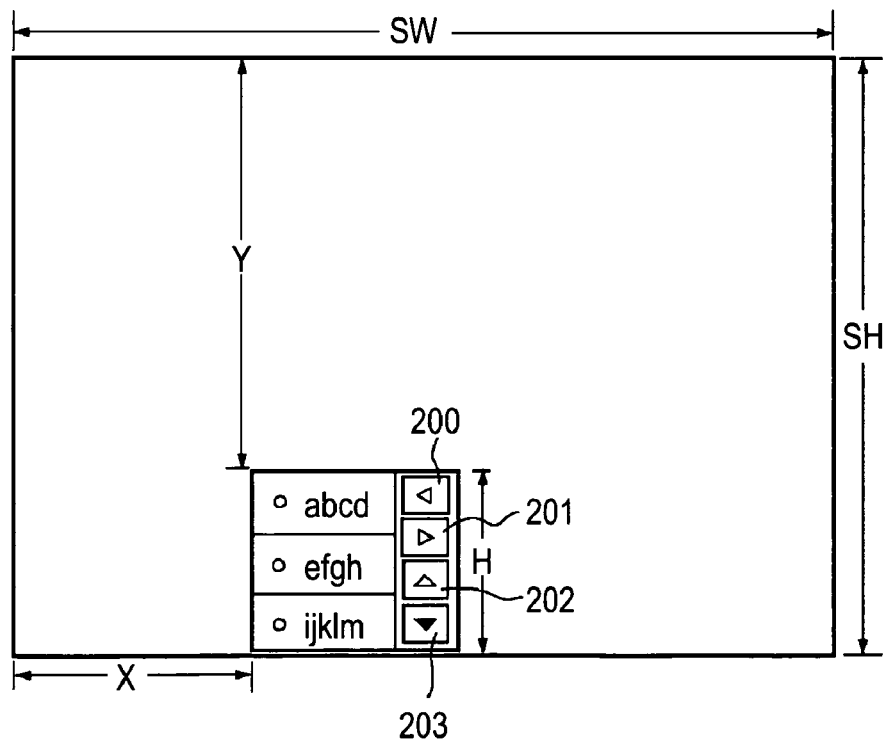
FIG. 12 shows an example in which the scroll buttons are collectively displayed in the rightmost part of the pop-up menu, according to the first embodiment of the present invention.

FIG. 12 shows an example in which the horizontal scroll buttons and the vertical scroll buttons are collectively displayed in the rightmost part of the pop-up menu, according to the first embodiment. Although the horizontal scroll buttons 200 and 201 are arranged at the upper side and the vertical scroll buttons 202 and 203 area arranged at the lower side in the button area in FIG. 12, the present invention is not limited to this example. The horizontal scroll buttons 200 and 201 may be arranged at the lower side and the vertical scroll buttons 202 and 203 may be arranged at the upper side.

Figure 13:
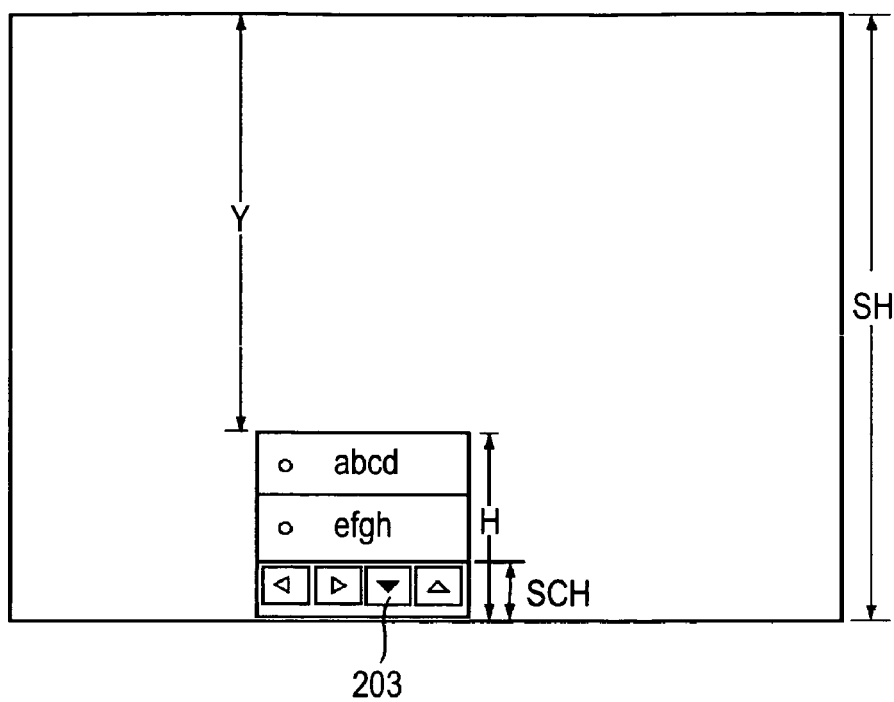
FIG. 13 shows an example in which all the scroll buttons are collectively displayed in the bottom part of the pop-up menu.

FIG. 13 shows an example in which the horizontal scroll buttons 200 and 201 and the vertical scroll buttons 202 and 203 are displayed in the bottom part of the pop-up menu. Here, the third menu item "ijklm" becomes visible only after the vertical scroll button 203 is pressed.

Figure 14:
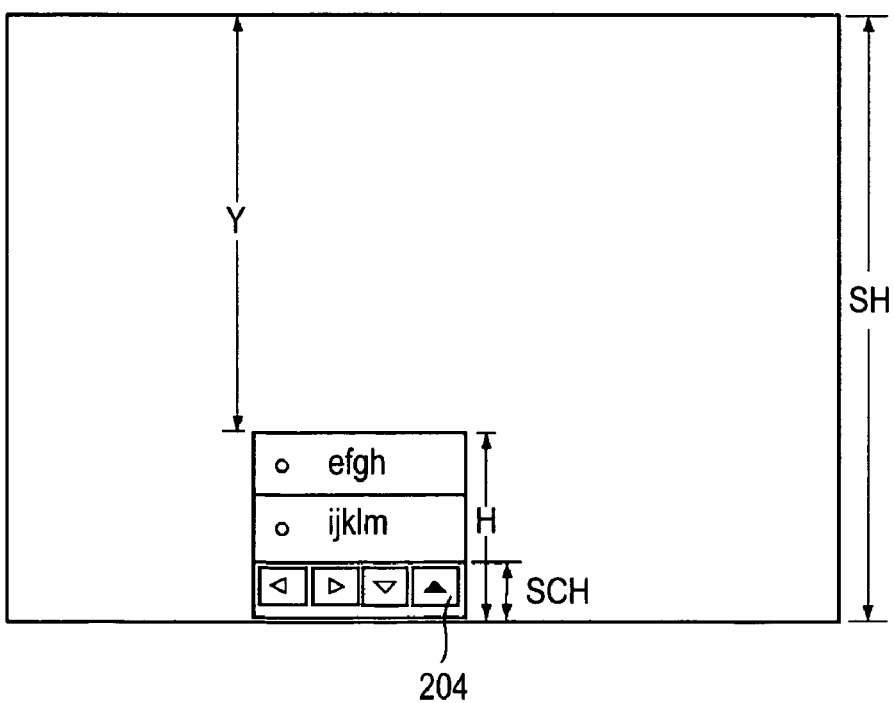
FIG. 14 shows a state in which items are scrolled downward from the state shown in FIG. 13.

FIG. 14 shows a state in which the downward vertical scroll button 203 is pointed in the state in FIG. 13 to scroll the pop-up menu downward by an amount corresponding to one item. In this case, the first menu item "abcd" is hidden and the upward vertical scroll button 204 is enabled.

Nevertheless, since some menu items in the pop-up menu are hidden in the examples in FIGS. 13 and 14, the visibility is reduced and all the menu items cannot be displayed without the up or down scrolling operation. However, as described above, according to the first embodiment, only shifting the display area of the scroll buttons allows the pop-up menu to be displayed with the number of visible items in the pop-up menu being sustained.

According to the first embodiment, if the pop-up menu extends beyond the bottom edge of the display screen, the scroll buttons are shifted to the rightmost part of the pop-up menu (in a direction orthogonal to the direction in which the pop-up menu extends beyond the display screen).

Moreover, the present invention is not limited to this case. For example, the scroll buttons may be shifted to the leftmost part of the pop-up menu (in a direction orthogonal to the direction in which the pop-up menu extends beyond the display screen) or to the top part of the pop-up menu (in a direction opposite to the direction in which the pop-up menu extends beyond the display screen). That is to say, the scroll buttons may be shifted to a direction in which the pop-up menu does not extend beyond the display screen. In other words, if the pop-up menu extends beyond the upper edge of the display screen, the scroll buttons may be shifted to the leftmost, rightmost, or bottom part of the pop-up menu.

Second Exemplary Embodiment

A second embodiment of the present invention will be described. According to the second embodiment, a case in which the vertical scroll buttons are displayed when the pop-up menu has a larger number of items is exemplified. Since the hardware structure of an information processing apparatus according to the second embodiment is similar to that in the first embodiment, a description is omitted herein.

Further, for explanatory purposes, the provided example in the second exemplary embodiment includes a pop-up menu having nine items "abcdefg1", "abcdefg2", "abcdefg3", "abcdefg4", "abcdefg5", "abcdefg6", "abcdefg7", "abcdefg8", and "abcdefg9". In order to display the pop-up menu in a specified position on the display screen of the display unit 103 (for example, a position where a user clicks the mouse or a position where a touch panel is touched when the display unit 103 includes the touch panel), the X coordinate of the position where the pop-up menu is displayed (the X coordinate of the upper left corner of the pop-up menu (refer to FIG. 16)) is shifted for every displayed scene.

Figure 17:
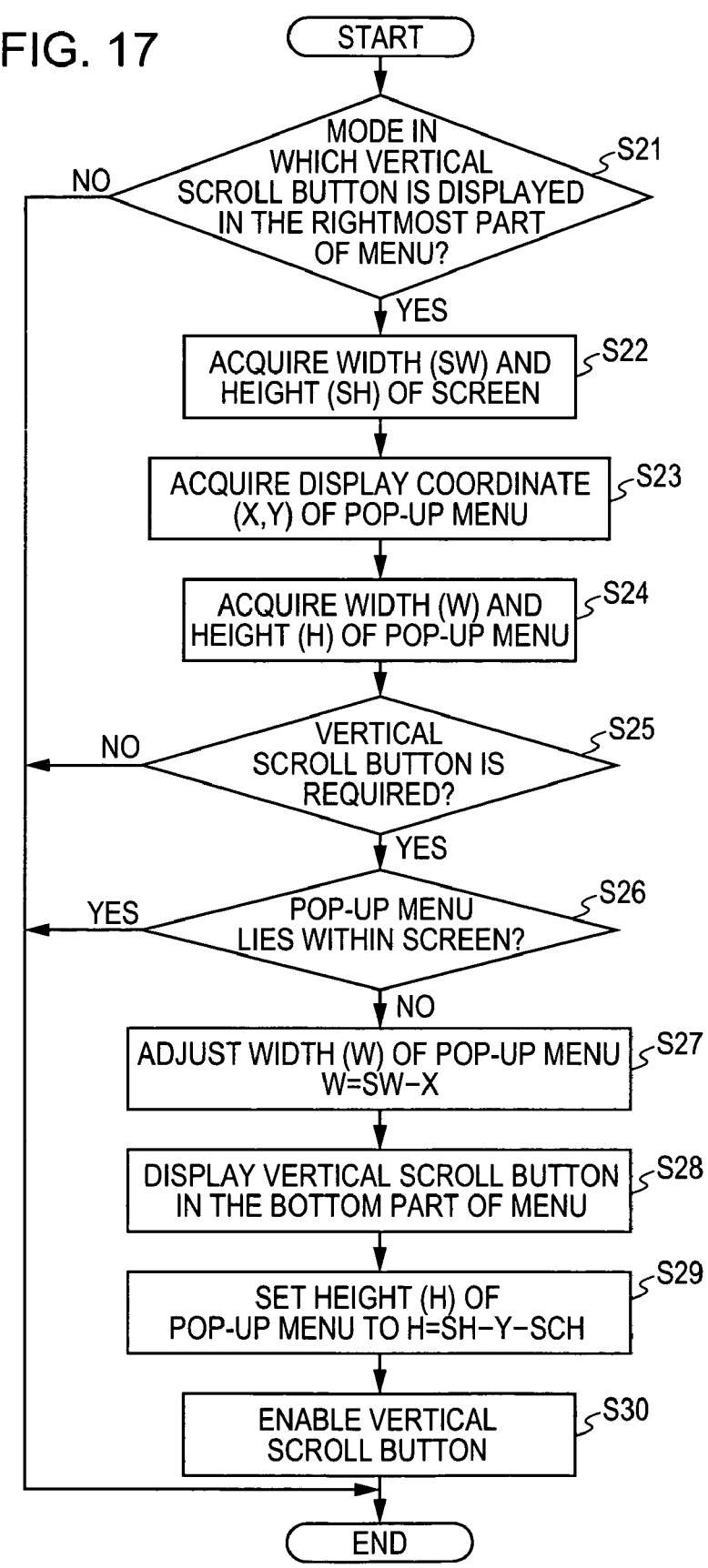
FIG. 17 is a flowchart showing an exemplary process of displaying the pop-up menu in the information processing apparatus according to the second embodiment of the present invention.

FIG. 17 is a flowchart showing an exemplary process of displaying the pop-up menu according to the second embodiment. The program for performing this process may be loaded in the RAM 102 in the execution of the program or stored in the ROM 109.

The exemplary process is started in response to an instruction to display the pop-up menu. In Step S21, the process determines whether a mode in which the vertical scroll buttons 202 and 203 are displayed in the rightmost part of the pop-up menu is set. If the process determines that the mode in which the horizontal scroll buttons are displayed in the rightmost part of the pop-up menu is not set (for example, a mode in which the vertical scroll buttons are displayed in the bottom part of the pop-up menu or a mode in which the vertical scroll buttons are not displayed is set), the process terminates.

If the process determines that the mode in which the vertical scroll buttons 202 and 203 are displayed in the rightmost part of the pop-up menu is set, then in Step S22, the process acquires a width SW and a height SH of the display screen of the display unit 103. In Step S23, the process acquires a coordinate (X, Y) of the position where the pop-up menu is displayed (a coordinate (X, Y) of the upper left corner of the pop-up menu). In Step S24, the process acquires a width W and a height H of the pop-up menu. In Step S25, the process determines whether the vertical scroll buttons are required to be displayed. Here, the process determines that the vertical scroll buttons are required to be displayed if the pop-up menu extends beyond the bottom edge of the display screen (that is, SH<Y+H). If the process determines that the vertical scroll buttons are not required, the process terminates. Otherwise, the process proceeds to Step S26.

In Step S26, the process determines whether the pop-up menu lies within the display screen. If the process determines that the pop-up menu lies within the display screen, the process terminates because there is no problem. If the process determines that the pop-up menu does not lie within the display screen, the process proceeds to Step S27. Specifically, the process determines in Step S26 whether the pop-up menu extends beyond the right edge of the display screen. If the process determines that the pop-up menu does not extend beyond the right edge of the display screen, the process terminates. Otherwise, the process proceeds to Step S27.

In Step S27, the process decreases the width W of the pop-up menu (W=SW−X) because the pop-up menu extends beyond the right edge of the display screen (for example, refer to FIG. 16). In Step S28, the process shifts the vertical scroll buttons displayed in the rightmost part of the pop-up menu to the bottom part thereof (for example, refer to FIG. 18). In Step S29, the process sets the height H of the pop-up menu to be equal to SH−Y−SCH (H=SH−Y−SCH) such that the pop-up menu lies within the display screen. SCH is a height of an area for displaying the vertical scroll buttons 202 and 203. In Step S30, the process enables the vertical scroll button 203 to indicate that there are invisible items.

Figure 15:
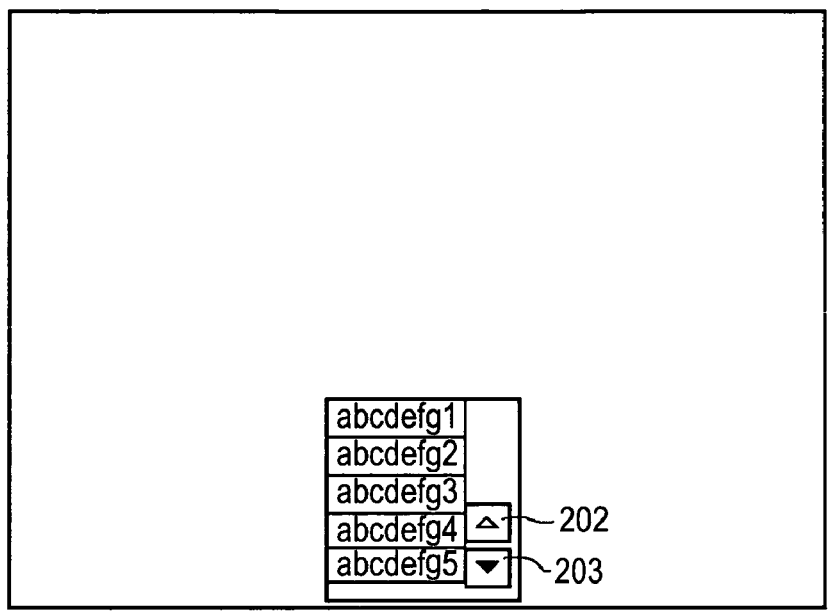
FIG. 15 shows a display example of the pop-up menu according to a second embodiment of the present invention.

FIG. 15 shows a state in which the pop-up menu lies within the display screen. In this state, since only the first to fifth menu items ("abcdefg1" to "abcdefg5") among the nine items are visible, only the downward vertical scroll button 203 is enabled.

FIG. 16 shows a state in which the pop-up menu does not lie within the display screen and extends beyond the right edge of the display screen. In this state, the width SW of the display screen is smaller than the sum of the X coordinate of the pop-up menu and the width W thereof (SW<X+W).

Figure 18:
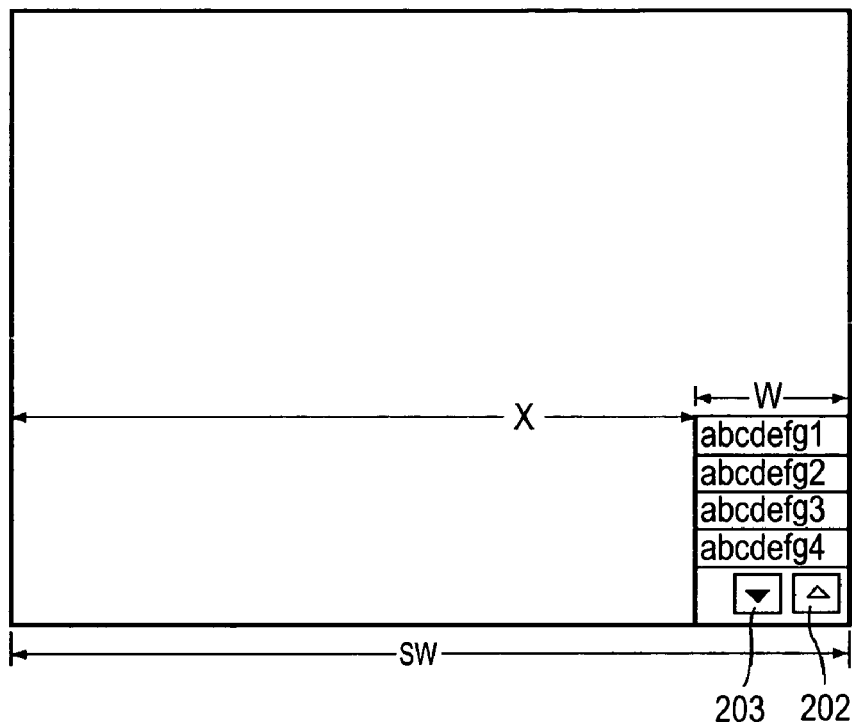
FIG. 18 shows a state in which vertical scroll buttons are displayed in the bottom part of the pop-up menu, according to the second embodiment of the present invention.

According to the second embodiment, if the pop-up menu extends beyond the right edge of the display screen, as shown in FIG. 16, a width SCW of the area for the scroll buttons in the rightmost part of the pop-up menu is acquired, the area for the scroll buttons in the rightmost part of the pop-up menu is cleared, and the area for the scroll buttons is shifted to the bottom part of the pop-up menu (for example, refer to FIG. 18). FIG. 18 shows a state in which the display position of the pop-up menu has been shifted.

Figure 19:
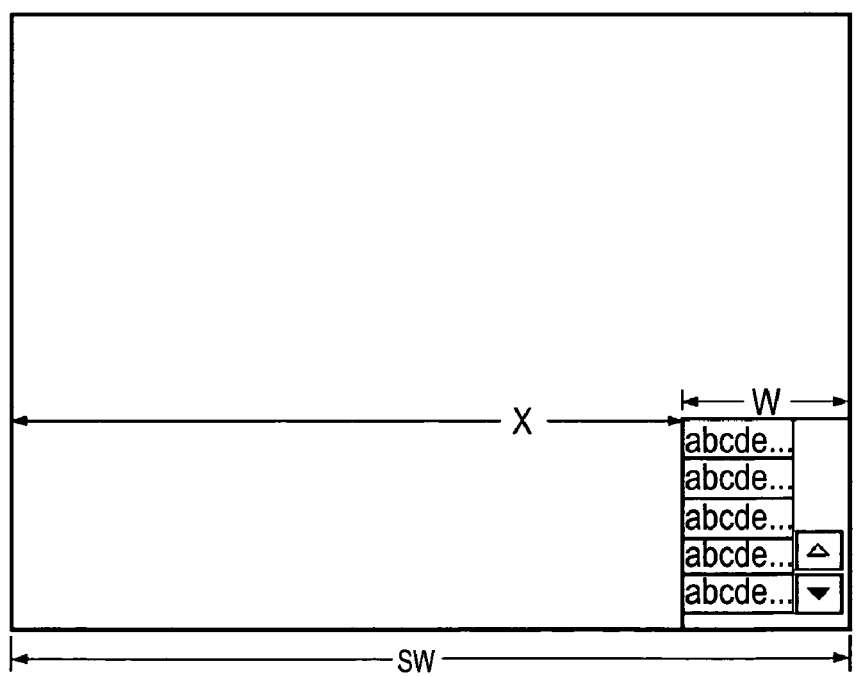
FIG. 19 shows a display example of the pop-up menu when the process according to the second embodiment of the present invention is not performed.

FIG. 19 shows an example in which the display width of the pop-up menu is simply reduced without performing the process according to the second embodiment.

Referring to FIG. 19, since the area for the vertical scroll buttons is kept being displayed in the rightmost part of the pop-up menu and the display width of the pop-up menu is reduced, part of the content of the items is hidden behind the area for the scroll buttons on the right hand of the items. Hence, the entire character string indicating the name of each item cannot be displayed in the pop-up menu and " . . . " indicating that there is a continued character string is used to abbreviate the character string. As a result, since only the first five characters of each item name are displayed in the example in FIG. 19, all the item names are displayed as "abcde . . . " and the difference between the item names becomes indistinguishable.

Figure 20:
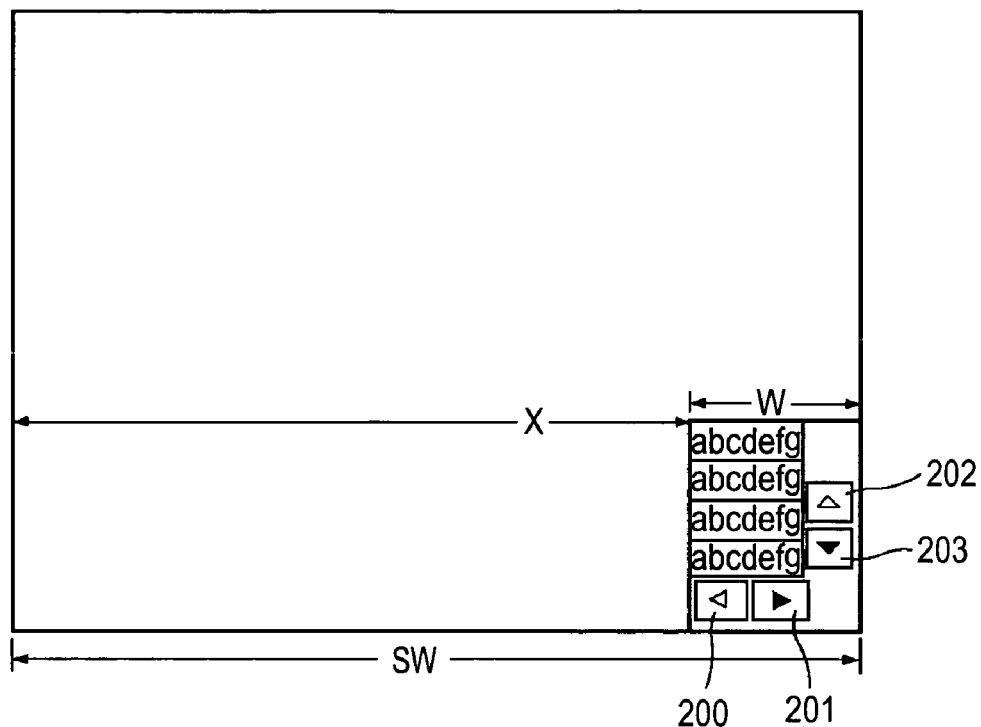
FIG. 20 shows an example in which the horizontal scroll buttons are displayed in the bottom part of the pop-up menu and the vertical scroll buttons are displayed in the rightmost part of the pop-up menu.

FIG. 20 shows an example in which the horizontal scroll buttons 200 and 201 are displayed in the bottom part of the pop-up menu and the vertical scroll buttons 202 and 203 are displayed in the rightmost part of the pop-up menu. This display allows each item name to be confirmed by scrolling the pop-up menu. However, even in this case, each item is indistinguishable without pointing the left or right horizontal scroll button 200 and 201.

Figure 21:
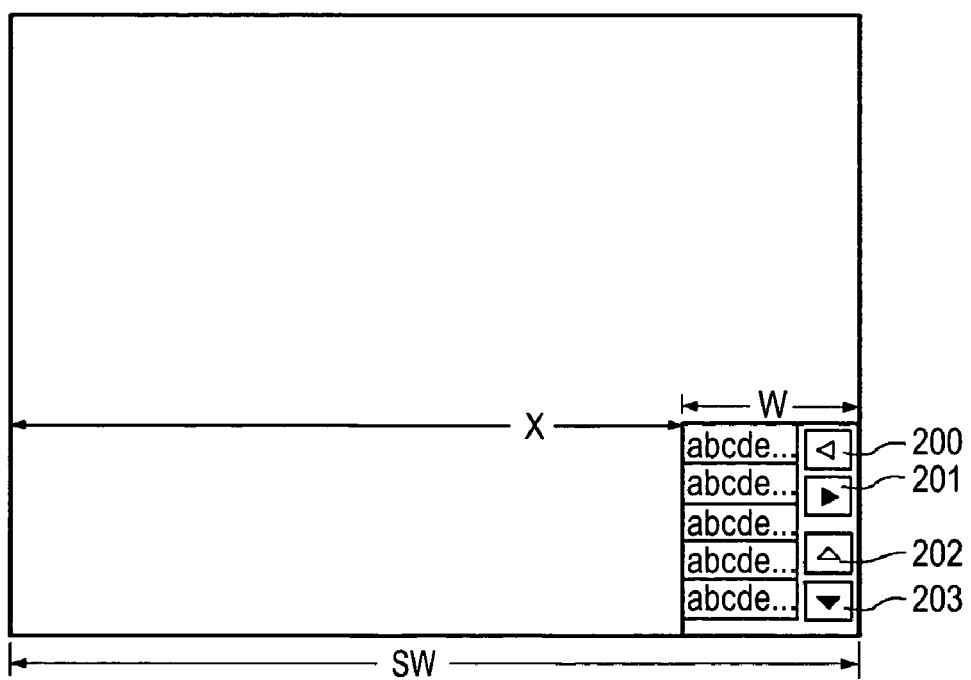
FIG. 21 shows an example in which both the horizontal scroll buttons and the vertical scroll buttons are collectively displayed in the rightmost part of the pop-up menu.

FIG. 21 shows an example in which some of the character strings of the items that cannot be displayed are abbreviated and both the horizontal scroll buttons 200 and 201 and the vertical scroll buttons 202 and 203 are collectively displayed in the rightmost part of the pop-up menu.

Also in this scenario, each item is indistinguishable, like the example in FIG. 19. In contrast, since the vertical scroll buttons 202 and 203 are displayed in the bottom part of the pop-up menu, as shown in FIG. 18, in the second embodiment, the item names are not hidden behind the area for the scroll buttons in the rightmost part of the pop-up menu, unlike the examples in FIGS. 19 to 21. Accordingly, a superior visibility is attained and the item names are distinguishable.

As described above, the second embodiment is effective with the object of presenting a larger amount of information. And, according to the second embodiment, if the pop-up menu extends beyond the right edge of the display screen, the scroll buttons are shifted to the bottom part of the display screen (in a direction orthogonal to the direction in which the pop-up menu extends beyond the display screen). However, the present invention is not limited to this case. For example, the scroll buttons may be shifted to the leftmost part of the display screen (in a direction opposite to the direction in which the pop-up menu extends beyond the display screen) or to the top part of the display screen (in a direction orthogonal to the direction in which the pop-up menu extends beyond the display screen), that is, may be shifted to a direction in which the pop-up menu does not extend beyond the display screen. In other words, if the pop-up menu extends beyond the right edge of the display screen, the scroll buttons may be shifted to the top, bottom or leftmost part of the pop-up menu.

Third Exemplary Embodiment

A third embodiment of the present invention will now be described. According to the third embodiment, a case in which the scroll buttons are displayed in the rightmost or bottom part of the pop-up menu in accordance with situations in which the item names in the pop-up menu are displayed is exemplified. Since the hardware structure of an information processing apparatus according to the third embodiment is similar to that in the first embodiment, a description is omitted herein.

Figure 22:
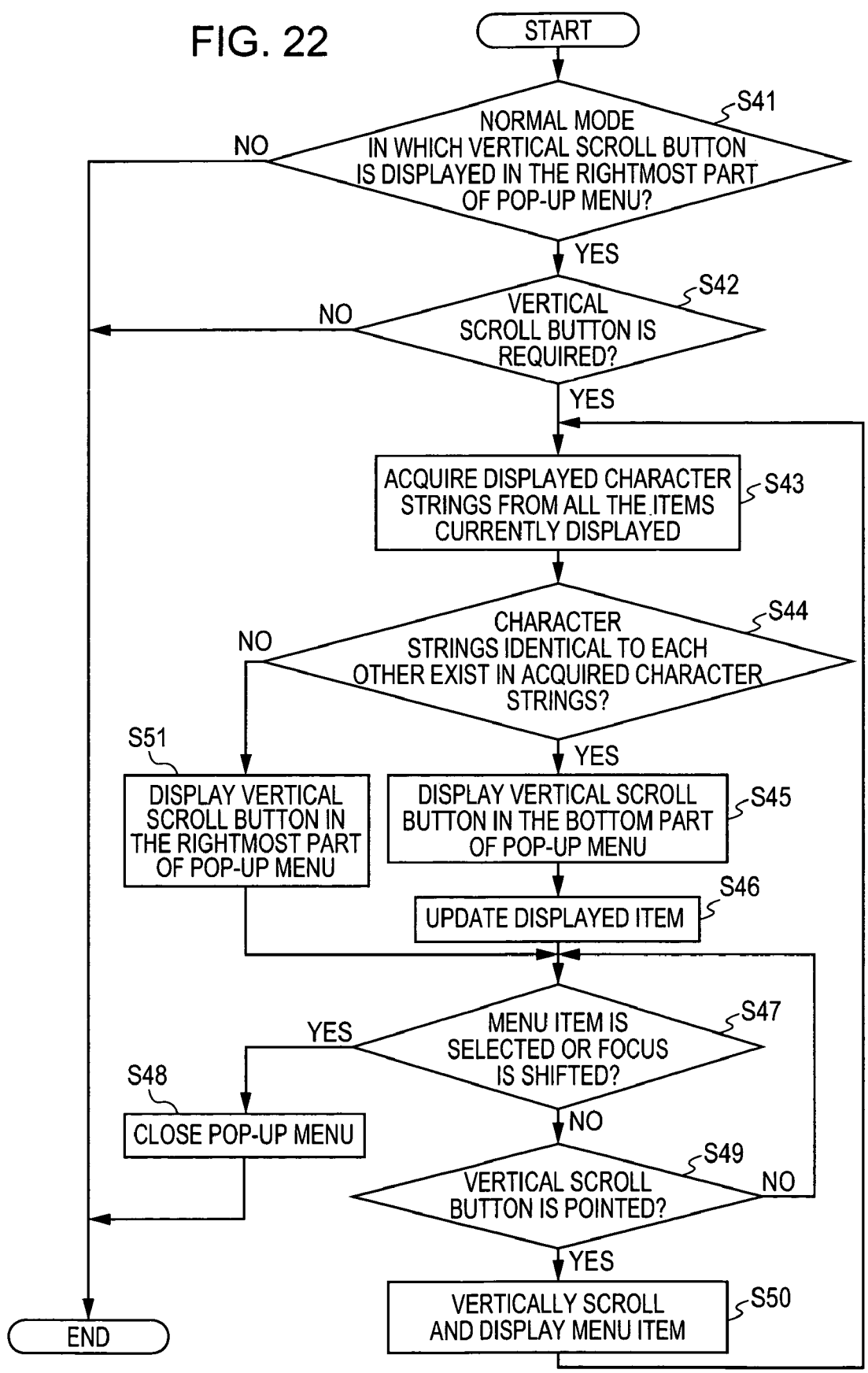
FIG. 22 is a flowchart showing an exemplary process of displaying the pop-up menu according to a third embodiment of the present invention.

FIG. 22 is a flowchart showing an exemplary process of displaying the pop-up menu according to the third embodiment. The program for performing this process is loaded in the RAM 102 in the execution of the program or is stored in the ROM 109. For explanatory purposes, the third embodiment includes a pop-up menu having nine items "abcdefg1", "abcdefg2", "abcdefg3", "abcdefg4", "abcdefg5", "A6", "B7", "C8", and "D9".

The process is started after the pop-up menu is displayed in a specified position on the display screen of the display unit 103 (for example, a position where the user touches a touch panel). The position where the pop-up menu is displayed is shifted in accordance with the specified position.

Figure 23:
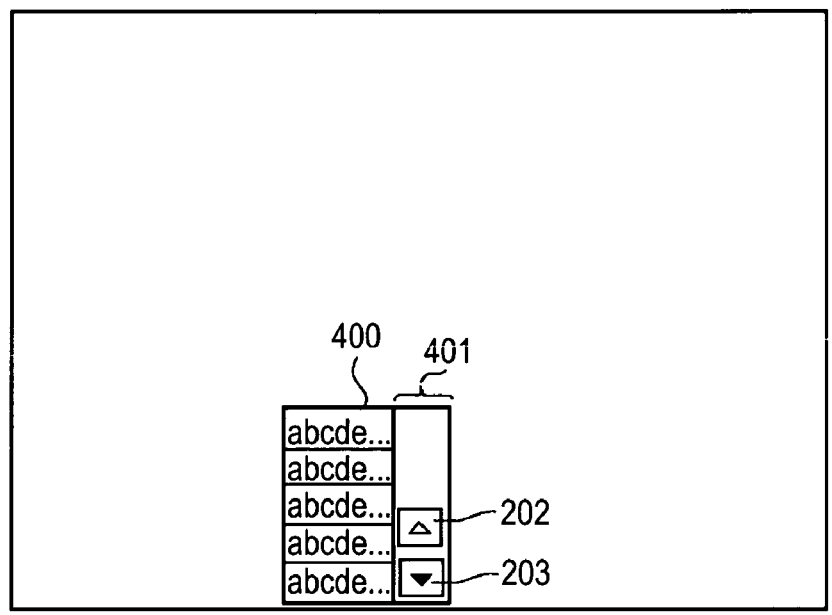
FIG. 23 shows a display example of the pop-up menu according to the third embodiment of the present invention.

In Step S41, the process determines whether a normal mode in which the vertical scroll buttons 202 and 203 are displayed in the rightmost part of a pop-up menu 400, as shown in FIG. 23, is set. If the process determines that the normal mode is not set (for example, a mode in which the vertical scroll buttons 202 and 203 are displayed in the bottom area of the pop-up menu 400 or a mode in which the vertical scroll buttons are not displayed is set), the process terminates.

If the process determines that the normal mode is set, then in Step S42, the process determines whether the vertical scroll buttons are required to be displayed. This determination is based on the determination of whether the pop-up menu lies within the display screen in the flowchart shown in FIG. 8 according to the first embodiment. More specifically, if the process determines that the pop-up menu does not lie within the display screen, that is, if SH<Y+H, the process determines that the vertical scroll buttons are required to be displayed. If the process determines that the vertical scroll buttons are not required to be displayed in Step S42, the process terminates. If the process determines in Step S42 that the vertical scroll buttons are required to be displayed, then in Step S43, the process acquires displayed character strings from all the items currently displayed.

FIG. 23 shows a display example of the pop-up menu 400. Only the first five items among the nine items are displayed, and the difference between the first five items is indistinguishable because the displayed items have the same character string "abcde . . . ".

Referring back to FIG. 22, in Step S44, the process determines whether the character strings identical to each other exist in the character strings acquired in Step S43. If the process determines that the character strings identical to each other exist, the process proceeds to Step S45. If the process determines that the character strings identical to each other do not exist, then in Step S51, the process displays the vertical scroll buttons in the rightmost part of the pop-up menu 400, as shown in FIG. 23, and the process then proceeds to Step S47.

Figure 24:
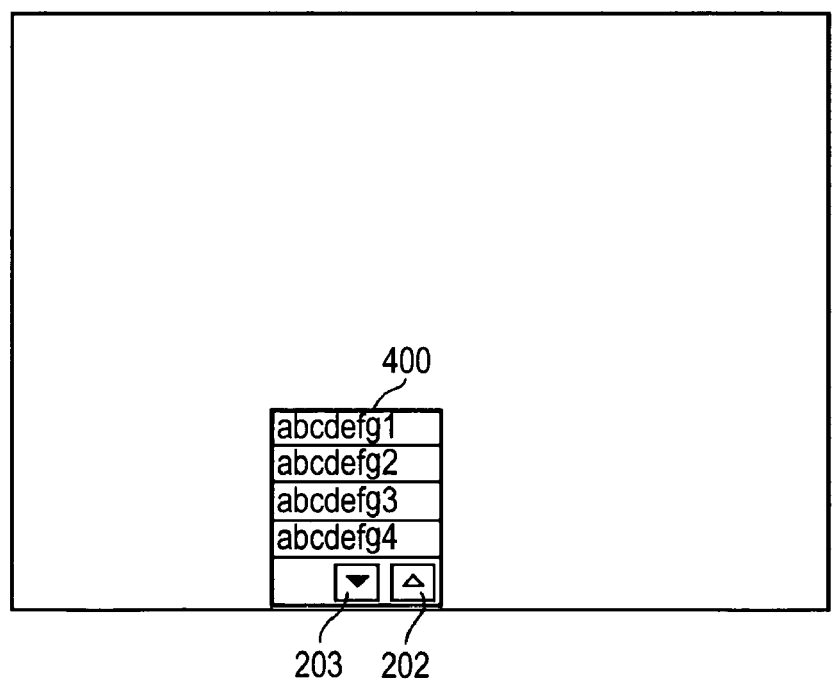
FIG. 24 shows an example in which the scroll buttons are shifted to the bottom part of the pop-up menu, according to the third embodiment of the present invention.

In the example in FIG. 23, since the width of the column where the item names are displayed is reduced by an amount corresponding to an area 401 where the vertical scroll buttons are displayed, some of the character strings of each item name are abbreviated and, therefore, the character strings identical to each other are displayed. Accordingly, in Step S45 in FIG. 22, the process displays the vertical scroll buttons 202 and 203 in the bottom area of the pop-up menu 400, as shown in FIG. 24.

In Step S46, the process increases the width of the column where the item names are displayed by the amount corresponding to the area 401 where the vertical scroll buttons 202 and the 203 are displayed to update the displayed items. This update allows the item names hidden behind the area 401 where the vertical scroll buttons are displayed to be displayed and the items are distinguishable. More specifically, if the process determines that the displayed items identical to each other exist in the displayed items in the pop-up menu 400, which is an item list component, the process displays the vertical scroll buttons 202 and 203 (the scroll indicators for indicating scroll display of the displayed items) in the bottom part (or the top part) of the pop-up menu 400, which is an item list component.

In Step S47, the process determines whether a menu item is selected, or focus is shifted outside the pop-up menu. If the process determines that a menu item is selected or a part outside the pop-up menu is touched to shift the focus outside the pop-up menu, then in Step S48, the process closes the pop-up menu and terminates.

If the process determines in Step S47 that a menu item is not selected and a part outside the pop-up menu is not touched, then in Step S49, the process determines whether the vertical scroll button 202 or 203 is pointed. If the process determines that neither the vertical scroll button 202 nor the vertical scroll button 203 is pointed, the process goes back to Step S47 to repeat the above processing. If the process determines in Step S49 that the vertical scroll button 202 or the vertical scroll button 203 is pointed, then in Step S50, the process scrolls the column of the menu items upward or downward depending on the pointed vertical scroll button.

Figure 25:
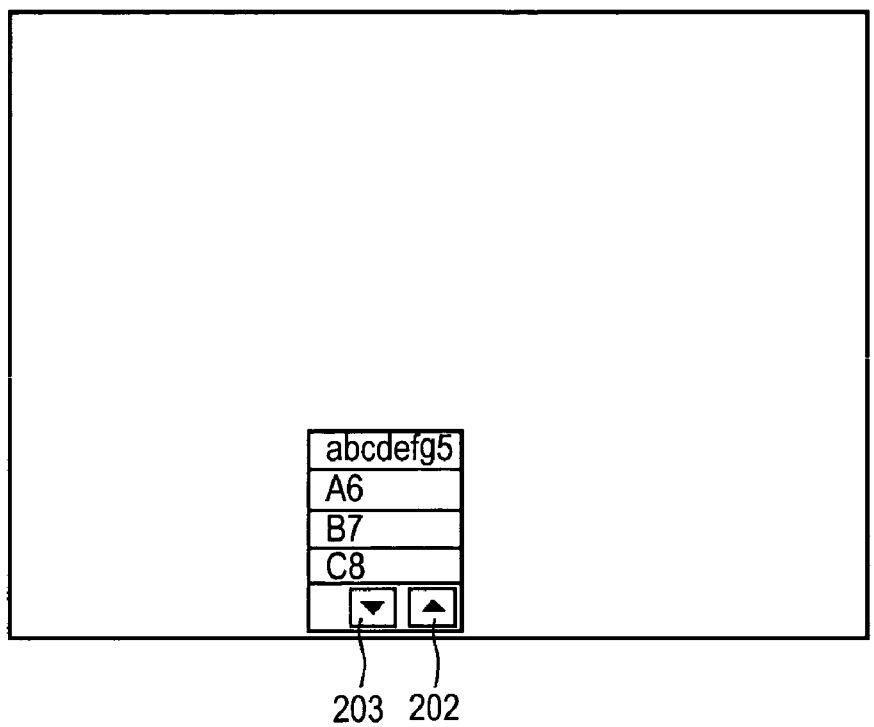
FIG. 25 shows a display example of the pop-up menu when the vertical scroll button is pointed in the state shown in FIG. 24 to scroll the column of the menu items downward.

FIG. 25 shows a display example of the pop-up menu when the vertical scroll button 203 is pointed in the state shown in FIG. 24 to scroll the column of the menu items downward.

Figure 26:
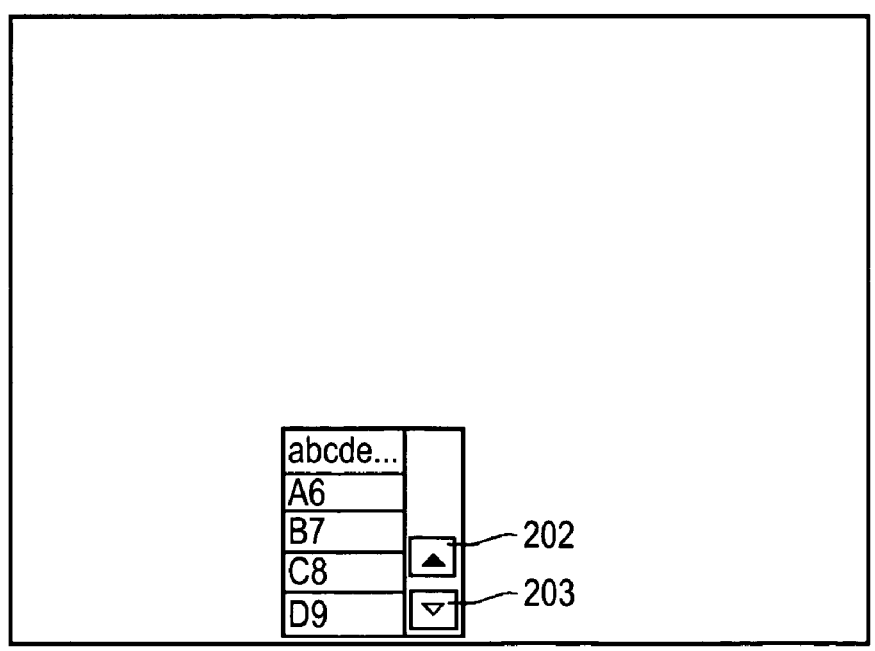
FIG. 26 shows an example in which the vertical scroll button is pointed in the state shown in FIG. 25 to display the last menu item.

FIG. 26 shows an example in which the last menu item ("D9") is displayed, instead of the display in FIG. 25. Since the difference between the displayed item names is distinguishable in FIG. 26, the vertical scroll buttons are displayed in the rightmost part of the pop-up menu in Step S51 in FIG. 22.

As described above, according to the third embodiment, shifting the area where the scroll buttons are displayed in accordance with the content of the items displayed in the pop-up menu allows the display to be updated such that the difference between the menu items becomes distinguishable if the difference is indistinguishable. In addition, if the difference between the displayed menu items is distinguishable, the visibility can be improved because the number of displayed items increases.

Fourth Exemplary Embodiment

A fourth embodiment of the present invention will now be described. According to the fourth embodiment, the List, which is an item list component in which an item can be selected, is exemplified. Since the hardware structure of an information processing apparatus according to the fourth embodiment is similar to that in the first embodiment, a description is omitted herein.

The List, which is an item list component in which an item can be selected, will be described with reference to FIGS. 4 to 7 described above in the fourth embodiment.

An exemplary List having multiple columns (three columns in FIGS. 4 to 7) is shown in FIG. 4. Horizontal scroll buttons 501 to 504 are provided in the first and third columns, whereas no horizontal scroll button is provided in the second column. The second column includes nine items "center 012345678901", "center 012345678902", "center 012345678903", "center 012345678904", "center 012345678905", "center 012345678906", "center 012345678907", "center 012345678908", and "center 012345678909".

Figure 27:
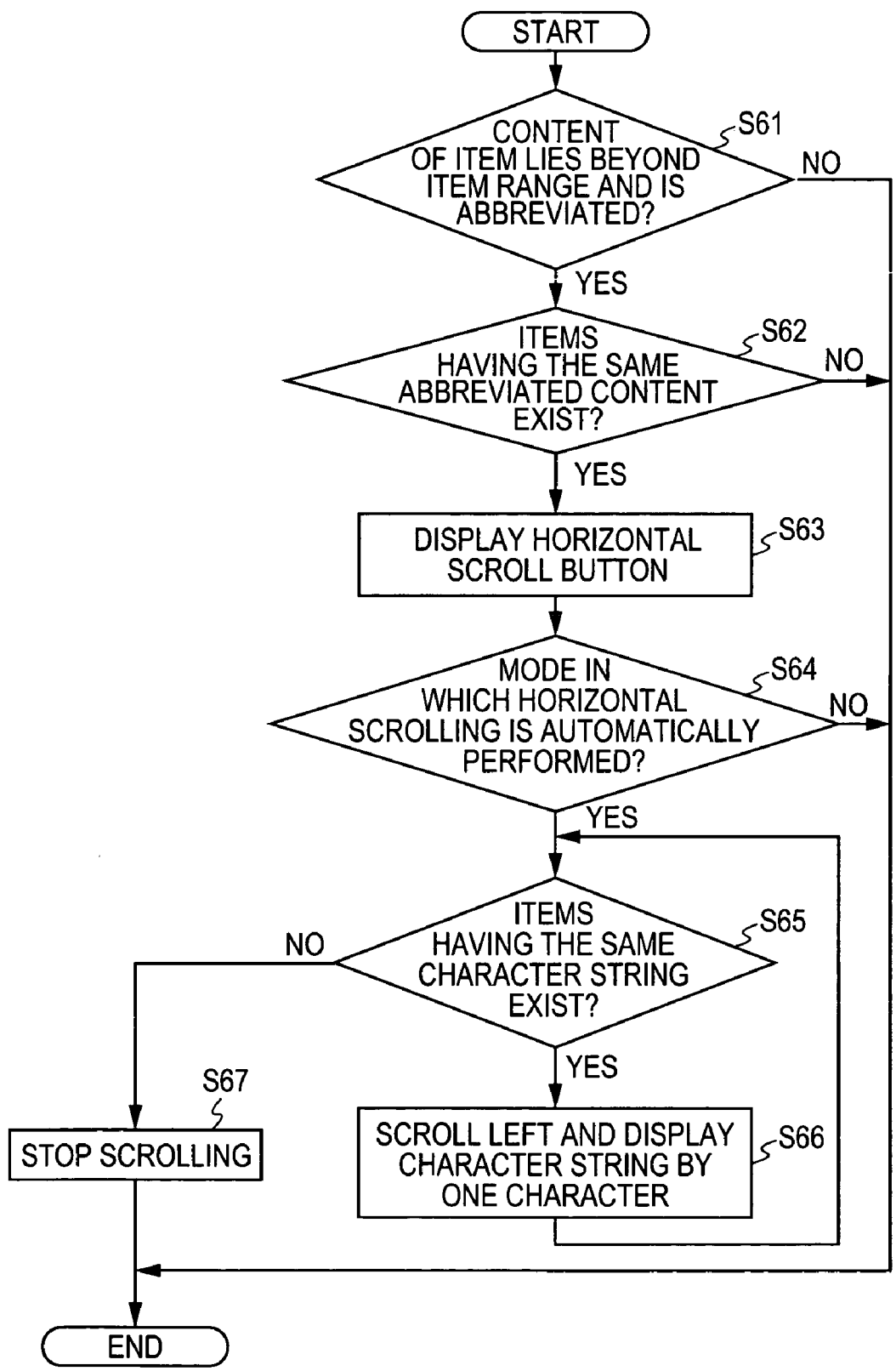
FIG. 27 is a flowchart showing an exemplary process according to a fourth embodiment of the present invention.

FIG. 27 is a flowchart showing an exemplary process according to the fourth embodiment. The program for performing this process is loaded in the RAM 102 in the execution of the program or is stored in the ROM 109.

In Step S61, the process determines whether the content of the items in each column lies beyond the display range and is abbreviated. If the process determines that the content of the items in each column lies within the display range and is not abbreviated, as in the first column in FIG. 4, the process terminates.

If the process determines that the content of the items of each column lies beyond the display range and is abbreviated to " . . . ", as in the second column in FIG. 4, then in Step S62, the process determines whether items having the same abbreviated content exist. If the process determines that items having the same abbreviated content do not exist, the process terminates. Since the items in the second column in the example in FIG. 4 are abbreviated to the same "center 01234567 . . . " and the difference between the items is indistinguishable, the process proceeds to Step S63. In Step S63, the process displays horizontal scroll buttons 505 and 506 (refer to FIG. 5).

FIG. 5 shows a state in which the horizontal scroll buttons 505 and 506 used for confirming the item names are provided in the second column.

Referring back to FIG. 27, in Step S64, the process determines whether a mode in which the horizontal scrolling is automatically performed is set. If the process determines that the mode is not set, the process terminates. If the process determines that the mode is set, then in Step S65, the process automatically and horizontally scrolls the items until the content of each item can be confirmed. Specifically, in Step S65, the process determines whether items having the same character string exist. If the process determines that items having the same character string exist, then in Step S66, the process scrolls the character string left by an amount corresponding to one character to display the character string. If no items having the same character string exist in Step S65, then in Step S67, the process stops the horizontal scrolling.

In other words, if the number of characters in the display items in the List, which is an item list component, exceeds a predetermined amount (the character strings of display items in the List extends beyond the display range), some of the characters of the display items are abbreviated. In addition, if it is determined that display items identical to each other exist in the abbreviated display items, scrolling the display items is continued until no display items identical to each other exist.

FIG. 6 shows a state in which the horizontal scrolling is automatically performed in the second column to display the items. In this state, since each item has hidden character strings on either side, the left and right horizontal scroll buttons 505 and 506 are enabled. Further, each display item in the second column has the same character string on the left of the second "0" and, if the character on the right of the second "0" is displayed, the left scrolling of the display item is stopped because no items having the same displayed content exist.

FIG. 7 shows a state in which the horizontal scrolling is stopped because part of the character strings in which the items differ from each other is displayed during the horizontal scrolling in the second column.

As described above, according to the fourth embodiment, if the difference between the items is indistinguishable (if the difference between the items is indistinguishable because the content of each item exceeds the display range, part of the content of each item is abbreviated, and some of the abbreviated display items are identical to each other), the horizontal scroll buttons are automatically provided for the items. Furthermore, the character strings indicating the content of the items are automatically and horizontally scrolled until the difference between the items becomes distinguishable. Accordingly, it is possible to select a desired item without any operation by the user.

Fifth Exemplary Embodiment

A fifth embodiment of the present invention will now be described. According to the fifth embodiment, the Choice in which an item can be selected from the pull-down menu is exemplified. Since the hardware structure of an information processing apparatus according to the fifth embodiment is similar to that in the first embodiment, a description is omitted herein.

Figure 29:
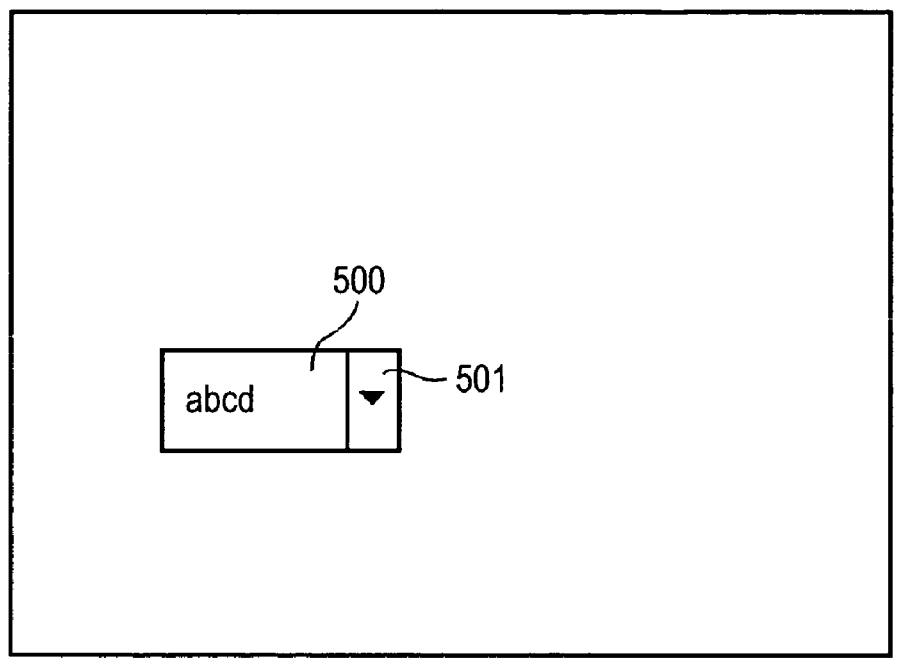
FIG. 29 shows an example in which only a title button of a Choice is displayed, according to the fifth embodiment of the present invention.

FIG. 29 shows a display example of the Choice according to the fifth embodiment. The Choice has a title button 500. Pressing the title button 500 displays a pull-down menu, which is the same as the pop-up menu. The vertical scroll buttons and/or the horizontal scroll buttons are required depending on the position where the Choice is located, the width of the Choice, or items to be added. For example, if an item having a larger width is added, the content of the displayed item can extend beyond the width of the Choice. In such a case, the horizontal scroll buttons are required.

There is a case in which increasing the number of items causes the pop-up menu to extend beyond the display screen. In such a case, a vertical scroll button 501 is required. According to the first to third embodiments of the present invention described above, if the scroll buttons are required, the scroll buttons are provided in the pop-up menu. If the area where the scroll buttons are displayed hinders the items from being distinguished, the scroll buttons are shifted to a desirable position. In contrast, according to the fifth embodiment of the present invention, providing the area for the scroll buttons in the title button eliminates the need for the area for the scroll buttons in the pop-up menu and, therefore, it is possible to display the items without hindering the items from being distinguished.

Figure 28:
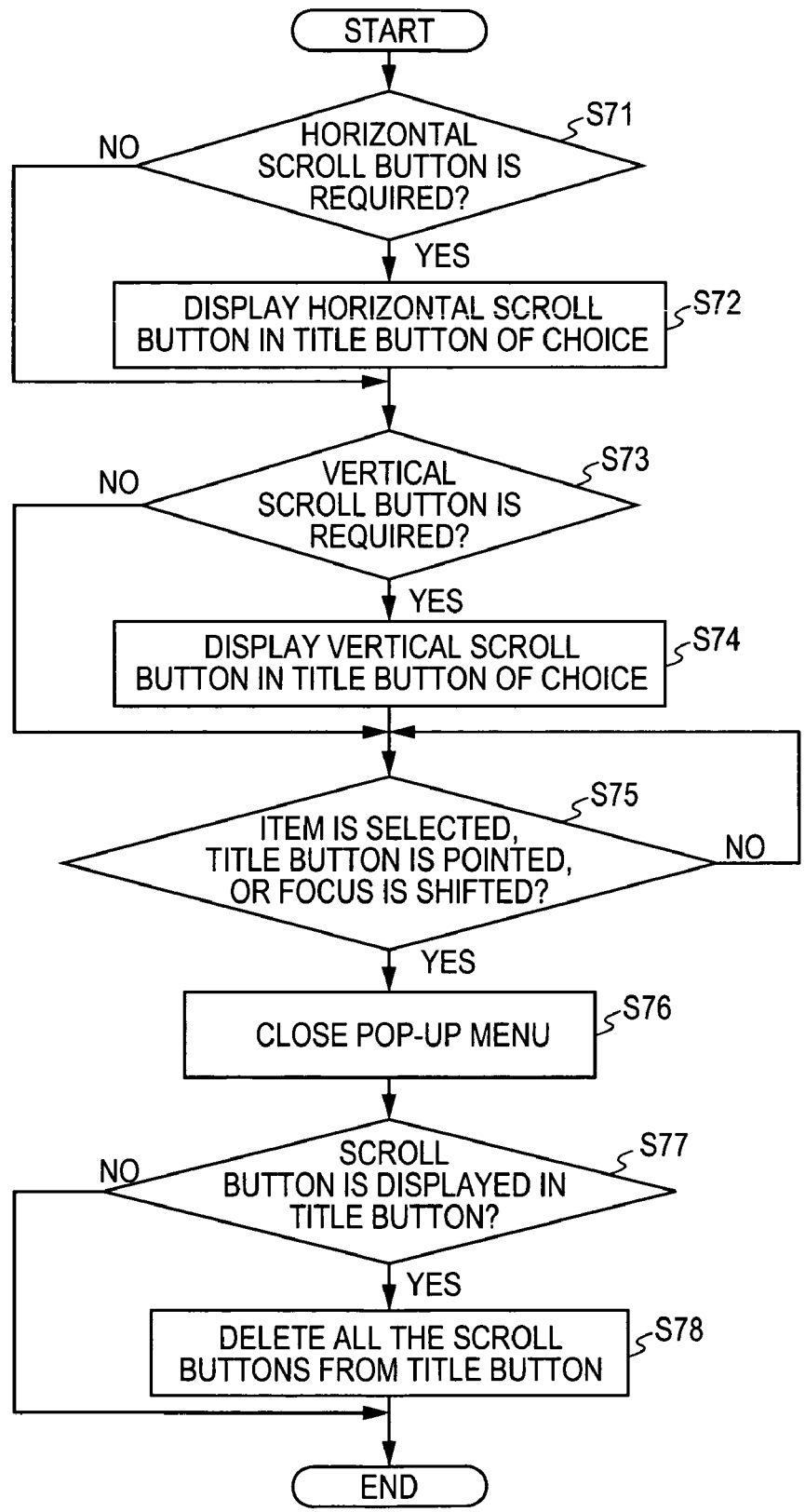
FIG. 28 is a flowchart showing an exemplary process according to a fifth embodiment of the present invention.

FIG. 28 is a flowchart showing an exemplary process according to the fifth embodiment. The program for performing this process is loaded in the RAM 102 in the execution of the program or is stored in the ROM 109. This process is started after the title button is pointed in the Choice and the pop-up menu in the pull-down menu is displayed.

In Step S71, the process determines whether the horizontal scroll buttons are required. If the content of the item exceeds the width of the Choice, the horizontal scroll buttons are required. If the process determines that the horizontal scroll buttons are not required, the process proceeds to Step S73. If the process determines that the horizontal scroll buttons are required, then in Step S72, the process displays the horizontal scroll buttons in the title button of the Choice and, then, proceeds to Step S73.

In Step S73, the process determines whether the vertical scroll button is required. If the pop-up menu extends beyond the bottom edge of the display screen, the vertical scroll button 501 is required. If the process determines that the vertical scroll button is not required, the process proceeds to Step S75. If the process determines that the vertical scroll button is required, then in Step S74, the process displays the vertical scroll button in the title button of the Choice and, then, proceeds to Step S75.

In Step S75, the process determines whether an item is selected, the title button is pointed, or focus is shifted outside the title button. If the process determines that neither one of them is applied, Step S75 is repeated. If the process determines that any of them is applied, then in Step S76, the process closes the pop-up menu and, then, proceeds to Step S77. In Step S77, the process determines whether the scroll buttons are displayed in the title button. If the process determines that the scroll buttons are not displayed in the title button, the process terminates. If the process determines that the scroll buttons are displayed in the title button, then in Step S78, the process deletes all the scroll buttons from the title button and terminates.

As described above, the Choice has the title button, which is a title indicator. The title button being the title indicator is a display indicator that receives the first instruction for displaying the pull-down items (pull-down menu) and is a display indicator in which the content of the item currently selected is displayed. If the title button being the title indicator is pointed, a pop-up menu is displayed. The pop-up menu is an item selection component that displays pull-down items from which an item can be selected. The horizontal and vertical scroll buttons, which are scroll indicators, are displayed in the title button being the title indicator. Furthermore, the scroll buttons being the scroll indicators are deleted from the title button being the title indicator in accordance with the determination of whether an item is selected from the pop-up menu being the item selection component. Alternatively, the scroll buttons being the scroll indicators are deleted from the title button being the title indicator in accordance with the determination of whether the title button being the title indicator is pointed or whether the focus is shifted outside the Choice.

FIG. 29 shows a display example of the Choice according to the fifth embodiment of the present invention. Since an item "abcd" is selected, the item "abcd" is displayed in the title button. For illustrative purposes, four items "abcd", "efgh", "ijklm", and "nopqr" are added to the Choice. The horizontal scroll buttons are not required in this example, and it is determined in Step S73 in FIG. 28 that the vertical scroll button is required because all the items cannot be displayed. The vertical scroll buttons are displayed in the title button of the Choice in Step S74 in FIG. 28.

Figure 30:
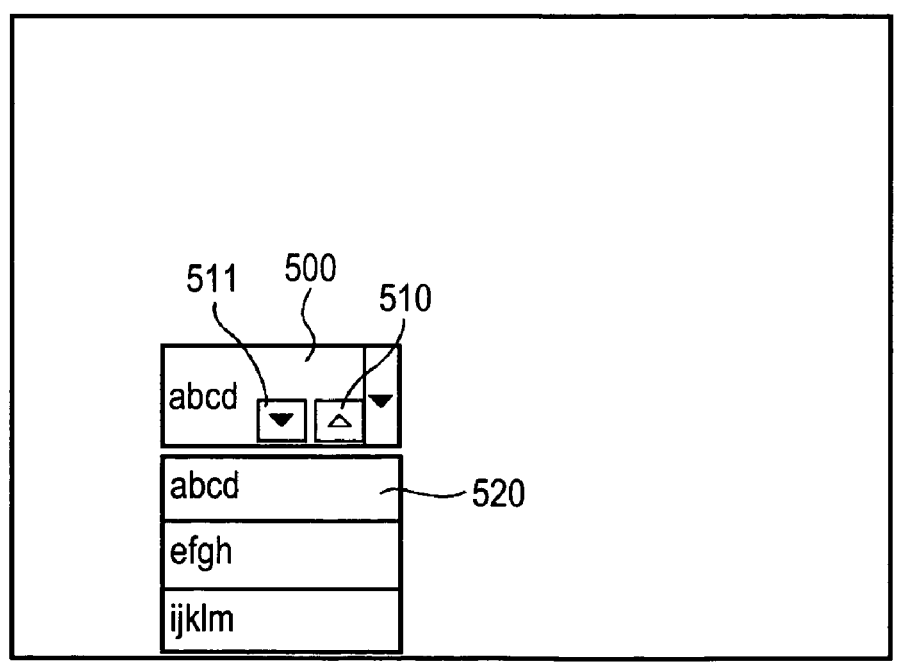
FIG. 30 shows an example in which the vertical scroll button is pointed in the state in FIG. 29.

FIG. 30 shows an example in which the vertical scroll button 501 is pointed in the state in FIG. 29. Since all the four items cannot be displayed in FIG. 30, up and down vertical scroll buttons 510 and 511 are added and displayed. If the item "abcd" 520 is selected, Steps S75 to S77 in FIG. 28 are performed. Since the vertical scroll button 501 is displayed in title button, the process proceeds to Step S78 to delete the vertical scroll button from the title button and returns to the state in FIG. 29.

In another example, four items "abcd", "efghefghefghefghefghefgh", "ijklm", and "nopqr" are added to the Choice. In this example, the horizontal scroll buttons are required because the name of the second item is long. In this case, horizontal and vertical scroll buttons 510 to 513 are displayed in the title button 500, as shown in FIG. 31.

Figure 31:
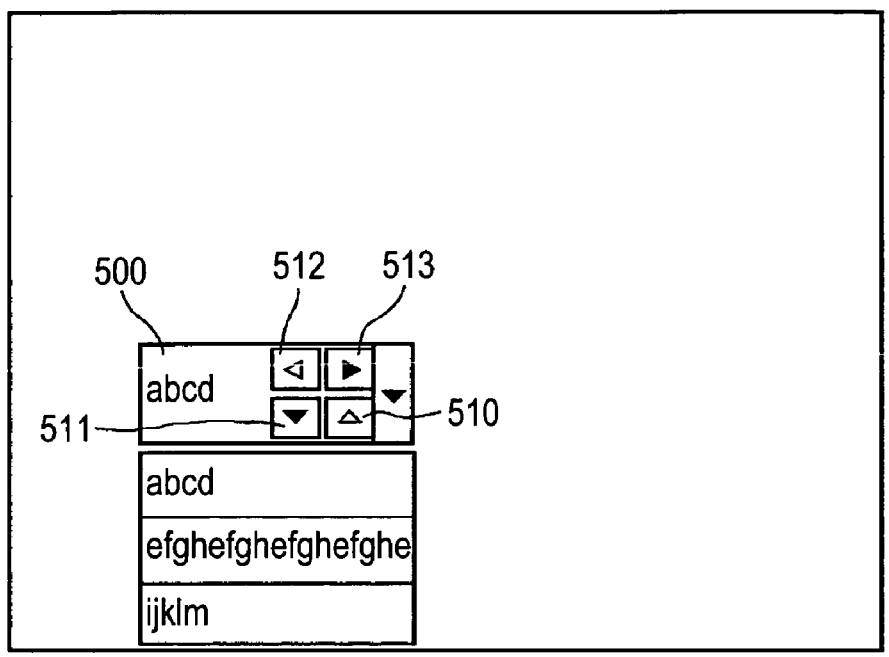
FIG. 31 shows an example in which the horizontal and vertical scroll buttons are displayed in the title button because the number of items and the number of characters indicating the name of each item exceeds the display size of the Choice, according to the fifth embodiment of the present invention.

FIG. 31 shows an example in which the horizontal and vertical scroll buttons are displayed in the title button 500 because the number of items and the number of characters indicating the name of each item exceeds the display size of the Choice. Although not shown, only the horizontal scroll buttons may be displayed in the title button. Displaying the scroll buttons in the area for the title button that is always displayed allows the display of the title button in the pop-up menu to be omitted and, therefore, the items can be displayed in the title button without problems.

Figure 32:
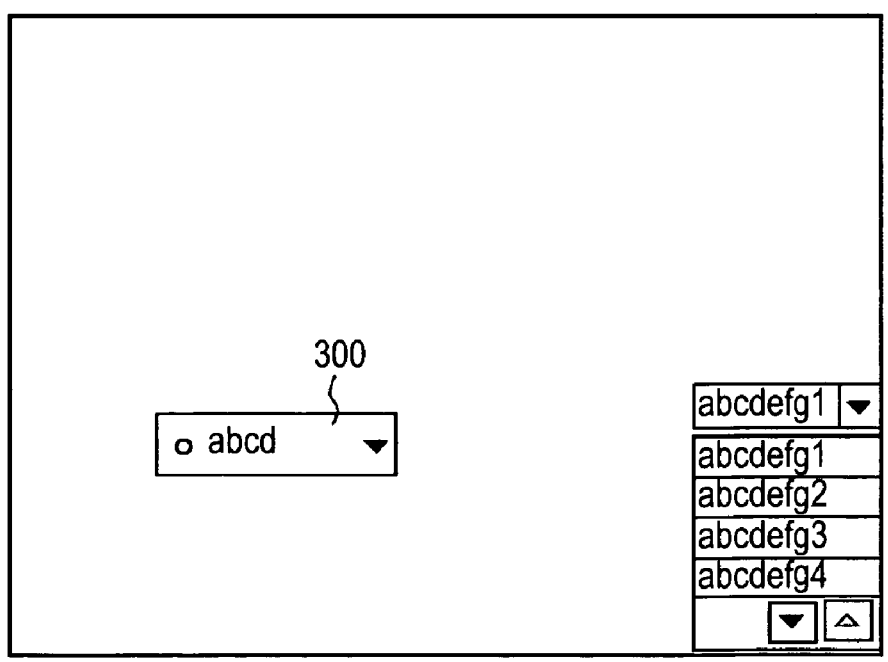
FIG. 32 shows a display example of the Choice in the summary of the embodiments.

Other Exemplary Embodiments, Various Features and Aspects of the Present Invention The pop-up menu is exemplified in the first to third embodiments of the present invention. However, the present invention is applicable to a component that is a Choice having the title button 301 that is pointed to display the pull-down menu, as shown in FIGS. 2 and 32. In other words, the present invention is applicable to the Choice replaced with the pop-up menu.

Figure 33:
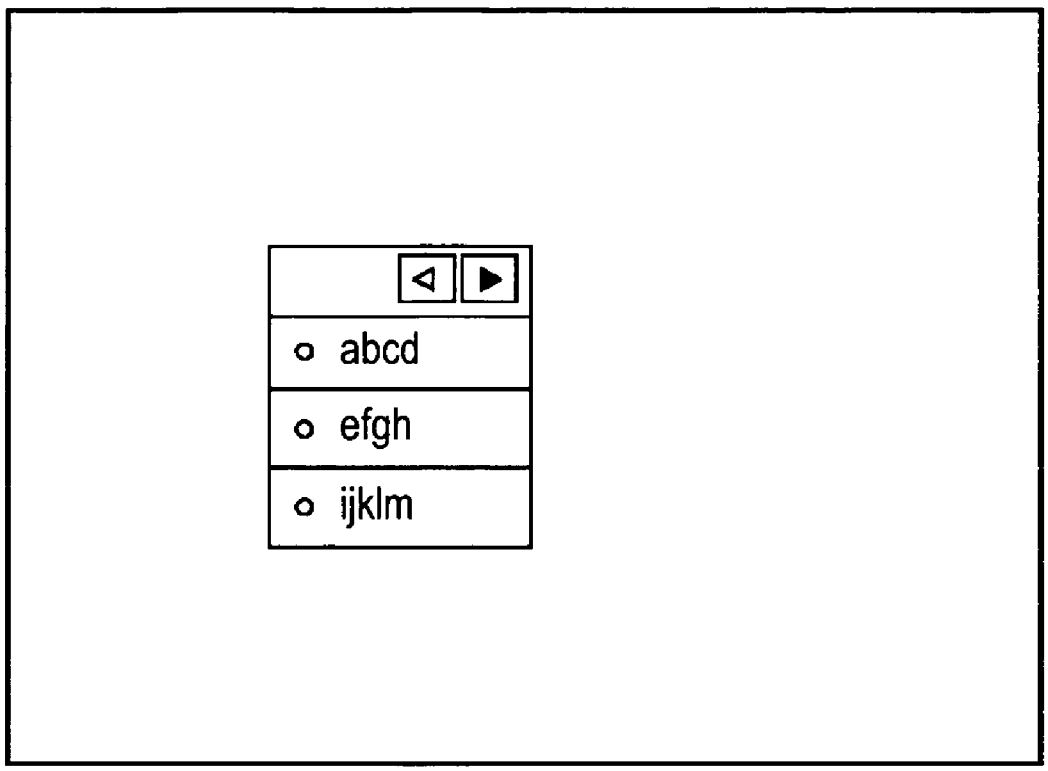
FIG. 33 shows an example in which the scroll buttons in FIG. 2 are displayed in the top part of the pop-up menu.

Although the scroll buttons are displayed in the bottom part of the pop-up menu in the first to third embodiments of the present invention, the scroll buttons may be displayed in the top part of the pop-up menu. For example, the scroll buttons displayed in the bottom part of the pop-up menu in FIG. 2 may be shifted to the top part of the pop-up menu, as shown in FIG. 33. Similarly, the scroll buttons displayed in the rightmost part of the pop-up menu may be shifted to the leftmost part of the pop-up menu.

When the scroll buttons displayed in the bottom or rightmost part of the pop-up menu are shifted to the top or leftmost part of the pop-up menu, respectively, the determination of whether the pop-up menu extends beyond the top or left edge of the display screen is required.

The List is exemplified in the fourth embodiment of the present invention. However, the present invention is applicable to a case in which the horizontal scroll buttons are automatically provided in the pop-up menu or the Choice such that the items becomes distinguishable if part of the content of the items is abbreviated and the items have the same displayed content.

The present invention may be applied to a system including a plurality of devices or may be applied to an apparatus including one device.

The present invention can be embodied by directly or remotely supplying the program code of software realizing the functions according to the above embodiments to a system or an apparatus, the computer in which system or apparatus reads out and executes the supplied program code. In this case, the alternative to the program may be used as long as it has the function of the program. Hence, the present invention is embodied by the program code itself installed in the computer in order to realize the functions of the present invention in the computer. In other words, the present invention is applicable to the program itself for realizing the functions of the present invention. The above program may be an object code, a program executed by an interpreter, or script data supplied to the OS, as long as it has the function of the program.

The storage medium supplying the program may be, for example, a floppy® disk, a hard disk, an optical disk, a magneto-optical disc (MO), a compact disc-read only memory (CD-ROM), a compact disc recordable (CD-R), a compact disc rewritable (CD-RW), a magnetic tape, a non-volatile memory card, a read only memory (ROM), or a digital versatile disc (DVD) (DVD-ROM or a DVD-R). Alternatively, a browser of the client computer may be used to access a Web page on the Internet, and the computer program of the present invention or a compressed file having an automatic installation function may be downloaded from the Web page in a storage medium, such as the hard disk. Alternatively, the program code in the program embodying the present invention may be divided into multiple files that are downloaded from different Web pages. In other words, the present invention is applicable to the WWW server from which multiple users download the program files for realizing the functions according to the present invention in the computer.

Furthermore, the program according to the present invention may be encrypted and the encrypted program may be stored in the storage medium, such as the CD-ROM, which is distributed to the users, the users satisfying predetermined conditions may be allowed to download key information used for decrypting the encrypted program from the Web page over the Internet, and the key information may be used to execute the encrypted program that is installed in the computer.

The computer that executes the readout program code realizes the functions of the embodiments described above. In addition, the OS or the like running on the computer may execute all or part of the actual processing based on instructions in the program code to realize the functions of the embodiments described above.

Alternatively, after the program code read out from the storage medium has been written in a memory that is provided in an expansion board included in the computer or in an expansion unit connected to the computer, the CPU or the like in the expansion board or the expansion unit may execute all or part of the actual processing based on instructions in the program code to realize the functions of the embodiments described above.

As described above, according to the embodiments of the present invention, if the pop-up menu or the Choice extends beyond the display screen, shifting the vertical scroll buttons and/or the horizontal scroll buttons associated with the pop-up menu or the Choice to a direction in which the pop-up menu or the Choice lies within the display screen allows the pop-up menu or the Choice to display an increased number of items. As a result, the visibility of the items in the pop-up menu or the Choice is improved and a desired item can be easily confirmed and selected without extra operation, such as the scrolling.

In addition, the display area of the scroll buttons can be automatically shifted depending on the content of the items. Furthermore, if part of the content of the items is abbreviated to display the same content in the items and, therefore, the difference between the items is indistinguishable, the items are scrolled until the difference between the items becomes distinguishable. A desirable item can be advantageously selected and specified without any operation by the user.

If the difference between the items is distinguishable, increasing the number of characters to be abbreviated (decreasing the number of displayed characters) increases the number of items that can be displayed to display an increased number of items and to improve the visibility.

If part of the content of the items is abbreviated in the List because the content of the items exceeds the display range and the abbreviated and displayed items have the same content, the difference between the items becomes indistinguishable. In such a case, automatically providing the horizontal scroll buttons allows a desirable item to be selected.

Automatically performing the horizontal scrolling until the difference between the items becomes distinguishable allows a desirable item to be selected without any operation by the user.

If the scroll buttons are required in the Choice, the scroll buttons are displayed in the title button that is always displayed. This allows the display of the scroll buttons in the pull-down menu (pop-up menu) that appears by pointing the title button to be omitted. Consequently, since the items are not hindered from being displayed by the scroll buttons, an increased number of items becomes distinguishable and can be displayed.

While the present invention has been described with reference to exemplary-embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-355883 filed Dec. 8, 2004, which is hereby incorporated by reference herein in its entirety.

What is claimed is:

1. A display apparatus comprising:
    a display unit configured to display an item list component including a display area and a vertical scroll indicator on a screen;
    an acquiring unit configured to acquire character strings to be displayed in the display area of the item list component when the vertical scroll indicator is displayed on a side of the item list component;
    a determining unit configured to determine whether one of the character strings acquired by the acquiring unit is identical to another one of the character strings acquired by the acquiring unit when the vertical scroll indicator is displayed on a side of the item list component; and
    a control unit configured to control the display unit to display the vertical scroll indicator on a top or bottom of the item list component so as to display longer character strings in the display area than the character strings displayed in the display area when the vertical scroll indicator is displayed on the side of the item list component in a case where the determining unit determines that one of the character strings is identical to another one of the character strings to be displayed in the display area when the vertical scroll indicator is displayed on a side of the item list component, and to display the vertical scroll indicator on the side of the item list component so as to display more character strings in the display area than the character strings displayed in the display area when the vertical scroll indicator is displayed on the top or bottom of the item list component in a case where the determining unit determines that none of the character strings is identical to another one of the character strings to be displayed in the display area when the vertical scroll indicator is displayed on a side of the item list component.

2. The display apparatus according to claim 1 further comprising:
    an item changing unit configured to change the character strings in the display area of the item list component, in response to an instruction to the vertical scroll indicator;
    a second acquiring unit configured to acquire the character strings to be displayed in the display area changed by the item changing unit when the vertical scroll indicator is displayed on the side of the item list component;
    a second determining unit configured to determine whether one of the character strings is identical to another one of the character strings in the changed character strings acquired by the second acquiring unit; and
    a changing unit configured to change the display position of the vertical scroll indicator, when it is determined that none of the character strings are identical to another one of the character strings by the second determining unit and the vertical scroll indicator is displayed on the top or bottom of the item list component, such that the vertical scroll indicator is displayed on the side of the item list component so as to display more character strings in the display area than the character strings displayed in the display area when the vertical scroll indicator is displayed on the top or bottom of the item list component, and change the display position of the vertical scroll indicator, when it is determined that one of the character strings is identical to another one of the character strings by the second determining unit and the vertical scroll indicator is displayed on the side of the item list component, such that the vertical scroll indicator is displayed on the top or bottom of the item list component so as to display longer character strings in the display area than the character strings displayed in the display area when the vertical scroll indicator is displayed on the side of the item list component.

3. A method for controlling a display, the method comprising:

displaying an item list component including a display area and a vertical scroll indicator;

acquiring character strings to be displayed in the display area of the item list component when the vertical scroll indicator is displayed on a side of the item list component;

determining whether one of the character strings acquired in the acquiring step is identical to another one of the character strings acquired in the acquiring step when the vertical scroll indicator is displayed on a side of the item list component; and controlling the displaying step to display the vertical scroll indicator on a top or bottom of the item list component so as to display longer character strings in the display area than the character strings displayed in the display area when the vertical scroll indicator is displayed on a side of the item list component in a case where the determining unit determines that one of the character strings is identical to another one of the character strings to be displayed in the display area when the vertical scroll indicator is displayed on a side of the item list component, and to display the vertical scroll indicator on the side of the item list component so as to display more character strings in the display area than the character strings displayed in the display area when the vertical scroll indicator is displayed on the top or bottom of the item list component in a case where the determining unit determines that none of the character strings is identical to another one of the character strings to be displayed in the display area when the vertical scroll indicator is displayed on a side of the item list component.

4. The method according to claim 3, further comprising:

changing the character strings in the display area of the item list component, in response to an instruction to said vertical scroll indicator;

acquiring the character strings to be displayed in the display area changed by the changing step when the vertical scroll indicator is displayed on the side of the item list component;

a second determining of whether one of the character strings is identical to another one of the character strings in the changed character strings; and changing the display position of the vertical scroll indicator, when it is determined that none of the character strings are identical to another one of the character strings in the changed character strings and the vertical scroll indicator is displayed on the top or bottom of the item list component, such that the vertical scroll indicator is displayed on the side of the item list component so as to display more character strings in the display area than the character strings displayed in the display area when the vertical scroll indicator is displayed on the top or bottom of the item list component, and changing the display position of the vertical scroll indicator, when it is determined that one of the character strings is identical to another one of the character strings in the changed character strings and the vertical scroll indicator is displayed on the side of the item list component, such that the vertical scroll indicator is displayed on the top or bottom of the item list component so as to display longer character strings in the display area than the character strings displayed in the display area when the vertical scroll indicator is displayed on the side of the item list component.

5. A computer readable storage medium containing computer-executable instructions for a display program, the computer readable medium comprising:

computer executable instructions for displaying an item list component including a display area and a vertical scroll indicator;

computer-executable instructions for acquiring character strings to be displayed in the display area of the item list component when the vertical scroll indicator is displayed on a side of the item list component;

computer-executable instructions for determining whether one of the character strings acquired by the acquiring instructions is identical to another one of the character strings acquired by the acquiring instructions when the vertical scroll indicator is displayed on a side of the item list component; and computer-executable instructions for controlling the displaying instructions to display the vertical scroll indicator on a top or bottom of the item list component so as to display longer character strings in the display area than the character strings displayed in the display area when the vertical scroll indicator is displayed on the side of the item list component in a case where the determining unit determines that one of the character strings is identical to another one of the character strings to be displayed in the display area when the vertical scroll indicator is displayed on a side of the item list component, and to display the vertical scroll indicator on the side of the item list component so as to display more character strings in the display area than the character strings displayed in the display area when the vertical scroll indicator is displayed on the top or bottom of the item list component in a case where the determining unit determines that none of the character strings is identical to another one of the character strings to be displayed in the display area when the vertical scroll indicator is displayed on a side of the item list component.

6. The computer readable storage medium for a display program according to claim 5, further comprising:

computer-executable instructions for changing the character strings in the display area of the item list component, in response to an instruction to said vertical scroll indication;

computer-executable instructions for acquiring the character strings to be displayed in the display area changed by the changing instructions when the vertical scroll indicator is displayed on the side of the item list component;

computer-executable instructions for a second determining of whether one of the character strings is identical to another one of the character strings in the changed character strings; and computer-executable instructions for changing the display position of the vertical scroll indicator, when it is determined that none of the character strings are identical to another one of the character strings in the changed character strings and the vertical scroll indicator is displayed on the top or bottom of the item list component, such that the vertical scroll indicator is displayed on the side of the item list component so as to display more character strings in the display area than the character strings displayed in the display area when the vertical scroll indicator is displayed on the top or bottom of the item list component, and changing the display position of the vertical scroll indicator, when it is determined that one of the character strings is identical to another one of the character strings in the changed character strings and the vertical scroll indicator is displayed on the side of the item list component, such that the vertical scroll indicator is displayed on the top or bottom of the item list component so as to display longer character strings in the display area than the character strings displayed in the display area when the vertical scroll indicator is displayed on the side of the item list component.

* * * * *